(12) United States Patent
Nien et al.

(10) Patent No.: US 12,237,800 B2
(45) Date of Patent: Feb. 25, 2025

(54) ELECTRIC WINDOW COVERING, CONTROL DEVICE THEREOF AND CONTROL METHOD THEREOF

(71) Applicant: Nien Made Enterprise Co., Ltd., Taichung (TW)

(72) Inventors: Chao-Hung Nien, Taichung (TW); Jui-Pin Jao, Miaoli County (TW); Ping-Yu Chu, Hsinchu County (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 654 days.

(21) Appl. No.: 17/533,125

(22) Filed: Nov. 23, 2021

(65) Prior Publication Data
US 2022/0085738 A1    Mar. 17, 2022

Related U.S. Application Data

(63) Continuation-in-part of application No. 17/125,961, filed on Dec. 17, 2020, now Pat. No. 12,006,765.

(30) Foreign Application Priority Data

Dec. 20, 2019  (TW) .................................. 108217046
Dec. 11, 2020  (TW) .................................. 109143877

(51) Int. Cl.
*E06B 9/32*      (2006.01)
*E06B 9/262*     (2006.01)
(Continued)

(52) U.S. Cl.
CPC ................ *H02P 6/30* (2016.02); *E06B 9/262* (2013.01); *E06B 9/322* (2013.01); *H02P 6/12* (2013.01);
(Continued)

(58) Field of Classification Search
CPC ... E06B 9/32; E06B 9/322; E06B 9/38; E06B 9/262; E06B 2009/2627; E06B 2009/3222;
(Continued)

(56) References Cited

U.S. PATENT DOCUMENTS 4,856,574 A * 8/1989 Minami .................... E06B 9/32
                                                     160/188
5,540,269 A * 7/1996 Plumer .................... E06B 9/84
                                                     160/3
(Continued)

FOREIGN PATENT DOCUMENTS

CN         101443525        5/2009
CN         106102522        11/2016
(Continued)

*Primary Examiner* — Johnnie A. Shablack
(74) *Attorney, Agent, or Firm* — Winston Hsu

(57) ABSTRACT

An electric window covering has a covering material, a driving device, a microcontroller, a position detecting module and a trigger detecting module. The position detecting module detects a position of a lower end of the covering material to generate a position information. The microcontroller compares the position information with a reference position to generate a position relationship with respect to the reference position. The trigger detecting module detects whether the covering material is moved by an external force for generating a detecting result. When the microcontroller determines that a trigger event is received according to the detecting result, the microcontroller configures the driving device to move the covering material according to the position relationship and the trigger event.

20 Claims, 33 Drawing Sheets

(51) Int. Cl.
*E06B 9/322* (2006.01)
*H02P 6/12* (2006.01)
*H02P 6/24* (2006.01)
*H02P 6/30* (2016.01)

(52) U.S. Cl.
CPC ........ *H02P 6/24* (2013.01); *E06B 2009/2627* (2013.01); *E06B 2009/3222* (2013.01)

(58) Field of Classification Search
CPC ..... E06B 2009/3225; E06B 2009/6818; E06B 2009/6845; E06B 2009/6836; H02P 6/30; H02P 6/12; H02P 6/24
See application file for complete search history.

(56) References Cited

U.S. PATENT DOCUMENTS

| | | | |
|---|---|---|---|
| 5,743,317 A * | 4/1998 | Beringer | E06B 9/581 |
| | | | 250/221 |
| 5,793,174 A * | 8/1998 | Kovach | E06B 9/72 |
| | | | 318/16 |
| 5,848,634 A * | 12/1998 | Will | E06B 9/70 |
| | | | 160/310 |
| 6,215,265 B1 * | 4/2001 | Wolfer | E06B 9/72 |
| | | | 318/434 |
| 6,283,190 B1 | 9/2001 | Hu | |
| 6,369,530 B2 | 4/2002 | Kovach | |
| 6,680,594 B2 * | 1/2004 | Collett | E06B 9/32 |
| | | | 318/434 |
| 6,708,750 B2 * | 3/2004 | Collett | E06B 9/32 |
| | | | 160/171 |
| 6,989,767 B2 * | 1/2006 | Fitzgibbon | E05F 15/41 |
| | | | 340/665 |
| 7,063,122 B2 | 6/2006 | Colson | |
| 7,445,035 B2 * | 11/2008 | Bruno | G05B 19/425 |
| | | | 160/310 |
| 7,468,591 B2 * | 12/2008 | Bruno | E06B 9/80 |
| | | | 318/467 |
| 7,538,504 B2 * | 5/2009 | D'Ayot | H02J 13/00032 |
| | | | 318/465 |
| 8,008,883 B2 * | 8/2011 | Hoff | G05B 19/425 |
| | | | 700/275 |
| 8,125,167 B1 * | 2/2012 | Mullet | E05F 15/70 |
| | | | 318/265 |
| 8,193,742 B2 | 6/2012 | Skinner | |
| 8,540,005 B2 | 9/2013 | Baugh | |
| 8,830,058 B2 | 9/2014 | Yeh | |
| 9,115,538 B2 * | 8/2015 | Andreasen | E06B 9/72 |
| 9,334,688 B2 | 5/2016 | Colson | |
| 9,335,753 B2 | 5/2016 | Baugh | |
| 9,399,888 B2 | 7/2016 | Colson | |
| 9,599,996 B2 * | 3/2017 | Lagarde | E05F 15/70 |
| 10,107,033 B2 * | 10/2018 | Mugnier | E06B 9/82 |
| 10,519,705 B2 * | 12/2019 | van de Wiel | E06B 9/68 |
| 10,590,701 B2 * | 3/2020 | Colson | E06B 9/68 |
| 10,605,001 B2 * | 3/2020 | Bartole | E05F 15/43 |
| 10,648,231 B2 * | 5/2020 | Dann | F16D 23/12 |
| 10,648,232 B2 * | 5/2020 | Colson | E06B 9/82 |
| 10,655,384 B2 | 5/2020 | Foley | |
| 11,035,172 B2 | 6/2021 | Rieper | |
| 11,377,905 B2 | 7/2022 | Colson | |
| 11,448,009 B2 | 9/2022 | Otsuka | |
| 11,486,193 B2 | 11/2022 | Chiang Huang | |
| 11,591,850 B2 * | 2/2023 | Campagna | E06B 9/322 |
| 11,732,519 B2 * | 8/2023 | Pincher | E06B 9/68 |
| | | | 160/1 |
| 11,840,885 B2 * | 12/2023 | Darlot | E06B 9/72 |
| 12,006,765 B2 * | 6/2024 | Nien | H02K 11/21 |
| 2001/0050538 A1 | 12/2001 | Kovach | |
| 2007/0089838 A1 | 4/2007 | Wetsema | |
| 2010/0206492 A1 | 8/2010 | Shevick | |
| 2011/0271602 A1 * | 11/2011 | Bartole | G01S 17/42 |
| | | | 49/506 |
| 2012/0200247 A1 | 8/2012 | Baugh | |
| 2012/0261079 A1 | 10/2012 | Chambers | |
| 2013/0087296 A1 | 4/2013 | Mullet | |
| 2016/0017656 A1 | 1/2016 | Adreon | |
| 2017/0096853 A1 | 4/2017 | Eubanks, Sr. | |
| 2018/0080279 A1 | 3/2018 | Eubanks, Sr. | |
| 2018/0116040 A1 | 4/2018 | Mann | |
| 2018/0174781 A1 | 6/2018 | Fangmann | |
| 2019/0169908 A1 * | 6/2019 | Siewert | E05F 15/43 |
| 2021/0010326 A1 * | 1/2021 | Pierce | E06B 9/40 |
| 2021/0238929 A1 | 8/2021 | Zhang | |
| 2023/0009409 A1 | 1/2023 | Lagarde | |
| 2023/0019542 A1 | 1/2023 | Dupielet | |
| 2023/0193688 A1 | 6/2023 | Strand | |

FOREIGN PATENT DOCUMENTS

| | | |
|---|---|---|
| CN | 110568787 | 12/2019 |
| EP | 3 489 452 A1 | 5/2019 |
| TW | M593223 | 4/2020 |
| WO | 2021/123176 A1 | 6/2021 |

* cited by examiner

ELECTRIC WINDOW COVERING, CONTROL DEVICE THEREOF AND CONTROL METHOD THEREOF

CROSS REFERENCE TO RELATED APPLICATIONS

This application is a continuation-in-part of U.S. patent application Ser. No. 17/125,961 filed on Dec. 17, 2020, which claims the benefit of priority to Taiwan patent application No. 108217046 filed on Dec. 20, 2019. This application also claims the benefit of priority to Taiwan patent application No. 109143877 filed on Dec. 11, 2020. The entirety of the foregoing applications is incorporated herein by reference for all purposes.

BACKGROUND OF THE DISCLOSURE

1. Field of the Disclosure

The present disclosure relates generally to a window covering, and more particularly to an electric window covering which uses one or more motors to adjust the covering material thereof.

2. Description of the Prior Art

When a window covering is installed to cover the building opening, the window covering can provide specific effects, such as keeping privacy, insulating heat, and blocking light. Typically, a conventional window covering includes a headrail and a covering material. In the headrail, there are usually a spindle, a decelerator, a motor, and a control device. The covering material is located below the headrail, and can be driven through a cord which is connected to the spindle. The decelerator is connected between the spindle and a shaft of the motor. The control device can be used to control the motor, whereby the shaft is able to, through the decelerator and the spindle, expand or retract the covering material.

If the covering material is hindered or even pulled downward by someone or some objects during its retracting or ascending and therefore is unable to rise smoothly, such a situation may cause damage to the blocking objects. In addition to this, the force that holds the covering material back will be also transferred to the motor through the spindle, becoming a force exerted on the motor in a direction opposite to its rotating direction. The covering material, the power transmitting mechanism, or even the motor itself may get damaged. On the other hand, while the covering material is expanding (i.e., closing), the motor will not stop operating until receiving a stop command, and therefore the covering material will keep descending even if it bumps into a blocking object. A continuously lowering covering material may damage the blocking object. Since the bottom of the covering material is obstructed by the blocking object, the covering material may also expand or lower unevenly with unbalanced tension. The rest of the cord wound around the spindle may become misarranged or loose, affecting the smoothness of the operations afterward.

In addition, the upper and lower limits corresponding to the completely retracted and expanded states of the covering material have to be set up before the window covering is ready to use so that the motor can automatically stop operating when the window covering is fully opened or closed. The conventional approach to do the set-up is to manually stop the motor through a control device when the covering material is fully raised or lowered. A position detector connected to the shaft of the motor is then used to detect and collect location information corresponding to the current states of the window covering, and the location information will be saved in the control device. Once the position detector detects the window covering is moved to a location corresponding to a recorded position information, the control device transmits a command to stop the motor from operating. This conventional approach to manually set up the upper and lower limits requires additional preparation in advance. The information deviation of the position detector can accumulate after a period of time. The upper limit and the lower limit may become inaccurate and have to be recalibrated, which unnecessarily increases the inconvenience of using a window covering.

Conventionally, the motor of the motorized window covering is located at the headrail, and the control board for controlling the motor is provided in the vicinity of the motor. A human-machine interface device (e.g., a wired controller, a wireless controller, and a cell phone) would be configured to communicate with the control board of the motor in a wired or wireless manner so that users can control the motor to lower, raise, or stop the covering material. Sometimes, the user wants to control the covering material, but the wired human-machine interface device has been damaged or the wireless human-machine interface device has been lost, damaged, or out of power. The covering material cannot be moved without the human-machine interface device, which is inconvenient to the users.

SUMMARY OF THE DISCLOSURE

One of the objectives of the present disclosure is to provide an electric window covering which can react to a trigger event in addition to a controller, whereby to move or stop the covering material in response to the trigger event.

The present disclosure provides an embodiment of an electric window covering, comprising: a covering material; a driving device connected to the covering material; and a control device, connected to the driving device, comprising a microcontroller, a position detecting module, and a trigger detecting module; wherein when the microcontroller configures the driving device to activate, the driving device drives the covering material to move a lower end of the covering material upward in a first moving direction to raise the covering material or to move the lower end of the covering material downward in a second moving direction to lower the covering material; wherein when the microcontroller configures the driving device to stop, the driving device stops the covering material from moving; wherein the position detecting module is configured to detect a position of the lower end of the covering material to generate a position information; wherein the microcontroller is configured to compare the position information with a reference position to generate a position relationship with respect to the reference position; wherein the trigger detecting module is configured to detect whether the covering material is moved by an external force for generating a detecting result; wherein when the microcontroller determines that a trigger event is received according to the detecting result, the microcontroller configures the driving device to move the covering material according to the position relationship and the trigger event.

The present disclosure also provides an embodiment of a control device for controlling an electric window covering, comprising: a microcontroller for configuring a driving device of the electric window covering to activate for driving the covering material to move a lower end of a covering material of the electric window covering upward in a first moving direction to raise the covering material or to move the lower end of the covering material downward in a second moving direction to lower the covering material; a position detecting module configured to detect a position of the lower end of the covering material to generate a position information; and a trigger detecting module configured to detect whether the covering material is moved by an external force for generating a detecting result; wherein the microcontroller is configured to compare the position information with a reference position to generate a position relationship with respect to the reference position; wherein when the microcontroller determines that a trigger event is received according to the detecting result, the microcontroller configures the driving device to move the covering material according to the position relationship and the trigger event; wherein when the microcontroller configures the driving device to stop, the driving device stop the covering material from moving.

The present disclosure also provides an embodiment of a method for controlling an electric window covering, comprising: detecting a position of a lower end of a covering material of the electric window covering to generate a position information by using a position detecting module of the electric window covering; comparing the position information with a reference position to generate a position relationship with respect to the reference position by using a microcontroller of the electric window covering; detecting whether the covering material is moved by an external force for generating a detecting result by using a trigger detecting module of the electric window covering; moving the covering material by using a driving device of the electric window covering according to the position relationship and the trigger event when the microcontroller determines that a trigger event is received according to the detecting result; and configuring the driving device to stop moving the covering material.

Through the design of the electric window covering of the present disclosure, the covering material can be manipulated by an external force when the manipulation is considered to be a trigger event. Therefore, the covering material could be controlled to move or stop without or in addition to using a human-machine interface device. In light of this, the electric window covering provided in the present disclosure would be more convenient to the users.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be best understood by referring to the following detailed description of some illustrative embodiments in conjunction with the accompanying drawings, in which.

DETAILED DESCRIPTION

Figure 1:
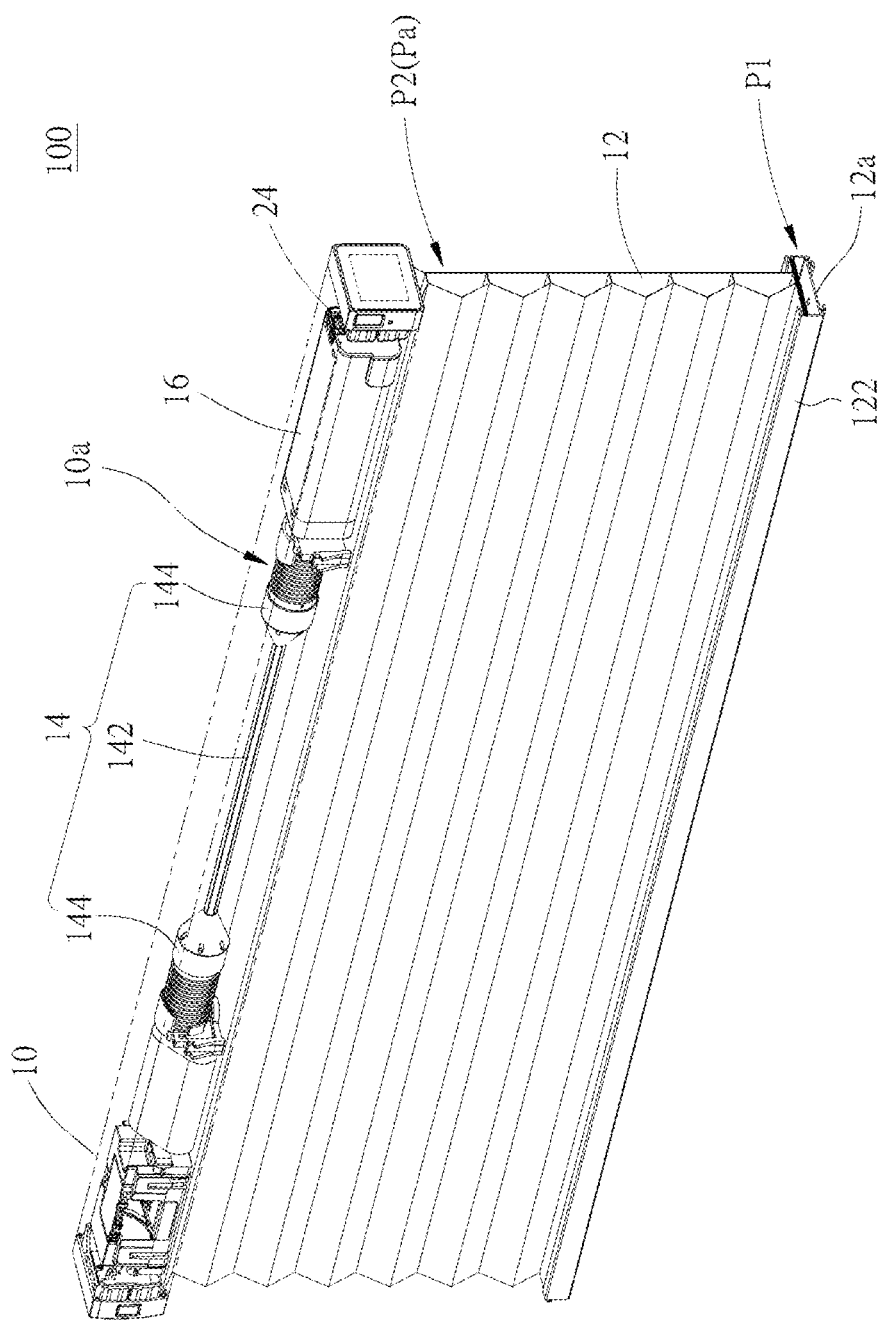
FIG. 1 is a perspective view of a first embodiment of an electric window covering of the present disclosure.

A first embodiment of an electric window covering 100 of the present disclosure is shown in FIGS. 1-10, which includes a headrail 10, a covering material 12, a rotating member 14, a driving device 16, and a control device 24. Some components are drawn with dashed lines for illustrative purposes.

The headrail 10 is realized with a frame having a receiving space 10a therein. The covering material 12 is located below the headrail 10. The covering material 12 has an upper end close to the headrail 10 and a lower end 12a away from the headrail 10.

The rotating member 14 is provided in the receiving space 10a of the headrail 10, and includes a spindle 142 and two spools 144. The spindle 142 extends in a longitudinal direction of the headrail 10. The spools 144 fixedly fit around the spindle 142, and are located apart from each other by a suitable distance. Each of the spools 144 has a cord 44 wound therearound, wherein an end of each of the cords 44 is fixed at the corresponding one of the spool 144.

Figure 9:
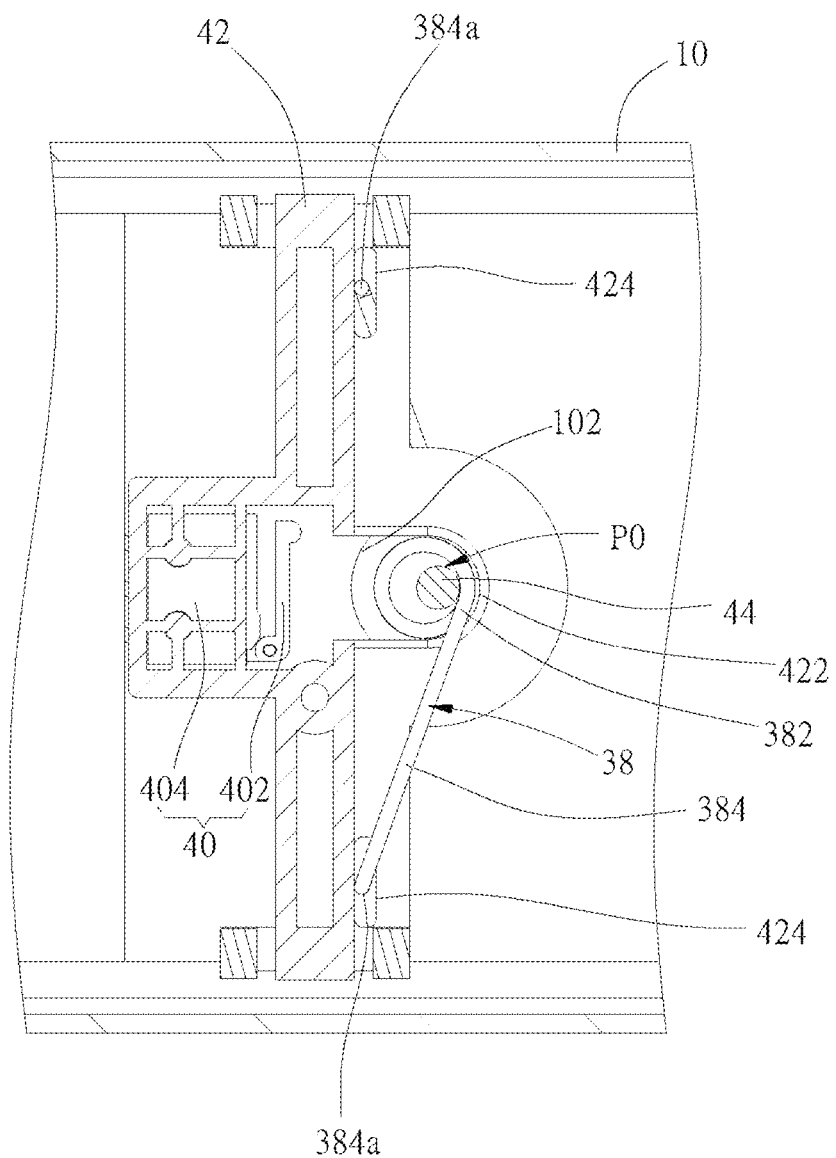
FIG. 9 is a schematic view showing the trigger detecting assembly when the cord is taut.

Each of the cords 44 passes through a cord hole 102 (as shown in FIG. 9) located at a bottom of the headrail 10, and goes through the covering material 12 in a vertical direction, with another end thereof reaching the lower end 12a of the covering material 12. The lower end 12a of the covering material 12 includes a bottom rail 122, wherein the other ends of the cords 44 are connected to the bottom rail 122. In some embodiments, the numbers of the spools 144 and the cords 44 are not limited to be two as exemplified above, and could be realized with only one or more than two spools and cords.

The driving device 16 is provided in the receiving space 10a of the headrail 10, and includes a motor 20, and a decelerator 22. The motor 20 is connected to the spindle 142 through the decelerator 22. A shaft 202 of the motor 20 is connected to the decelerator 22, and the decelerator 22 is connected to an end of the spindle 142. In an embodiment, the decelerator 22 is a planetary gearing decelerator. In other embodiment, the decelerator 22 may be realized with other suitable structures. The motor 20 drives the spindle 142 to rotate, and the spools 144 fixedly fitting around the spindle 142 would also be driven to rotate, whereby the spools 144 could release or reel in the cords 44 to expand (close) or retract (open) the covering material 12. A length of a segment of each of the cords 44 which can be fully released from the corresponding spool 144 due to the driving of the motor 20 is slightly longer than a length of the covering material 12 when it is fully expanded or lowered. The aforementioned length of the segment of each of the cords 44 released from the corresponding spool 144 refers to the segment length that each cord 44 released from the respective spool 144 by the driving of the motor 20.

The control device 24 is provided in the receiving space 10a of the headrail 10, and is electrically connected to the motor 20, wherein the control device 24 configures the motor 20 to activate, whereby to drive the covering material 12 to expand or retract. Furthermore, the control device 24 configures the motor 20 to stop moving when a moving speed of the lower end 12a of the covering material 12 decreases and such a situation lasts for a predetermined time. In this way, when the covering material 12 is expanded to eventually reach a fully expanded position, is retracted to eventually reach a fully retracted position, or encounters resistance during its expanding or retracting, the control device 24 could stop the covering material 12 from moving because the moving speed of the lower end 12a of the covering material 12 decreases for equal to or longer than the predetermined time. Whereby, the covering material 12 could stay in a fully expanded state or a fully retracted state. In addition, the covering material 12 would not exert further force on the blocking object that it bumps into during the expanding or retracting processes, and the electric window covering 100 could be prevented from being damaged.

In an embodiment, the control device 24 includes a control module 26 and a trigger detecting module 30. The control module 26 configures the motor 20 through a driving circuit 28 to drive the spindle 142 of the rotating member 14 to rotate in a first rotating direction D1 or a second rotating direction D2. When the spindle 142 of the rotating member 14 rotates in the first rotating direction D1, the spools 144 which fixedly fit around the spindle 142 would be driven by the spindle 142 to rotate as well, whereby to reel in the cords 44 and therefore to retract or raise the covering material 12. When the spindle 142 of the rotating member 14 rotates in the second rotating direction D2, the spools 144 which fixedly fit around the spindle 142 would be driven by the spindle 142 to release the cords 44, whereby to expand or lower the covering material 12.

The trigger detecting module 30 is electrically connected to the control module 26, and is configured to detect a rotating speed of the rotating member 14 or a rotating speed of the shaft 202 of the motor 20. While the covering material 12 is being retracted or raised, the control module 26 could, according to the detected rotating speed, determine whether the moving speed of the lower end 12a of the covering material 12 is lower than the moving speed moments ago, and whether such a situation lasts for the predetermined time. The control module 26 could learn if the covering material 12 has reached the fully retracted position or if it encounters a blocking object during the process of retracting or rising. The trigger detecting module 30 could further detect if any of the cords 44 has shifted away from a predetermined cord position P0, and the detection result could be used by the control module 26. If the trigger detecting module 30 detects that at least one of the cords 44 has shifted away from the predetermined cord position P0, the control module 26 could accordingly determine whether the moving speed of the lower end 12a of the covering material 12 has become lower than the moving speed moments ago, and whether such a situation has lasted at least for the predetermined time. Therefore, the control module 26 could use the detection result to determine if the covering material 12 has reached the fully expanded position or if it encounters resistance from a blocking object during the process of expanding or lowering. The control module 26 configures the motor 20 to stop if it determines that the covering material 12 is in any of the following circumstances: the covering material 12 has been completely retracted or raised to reach the fully retracted position, has been completely expanded or lowered to the fully expanded position, or encounters resistance during the expanding or retracting process. In some embodiments, e.g., the embodiment in FIG. 4, the control module 26 includes a microcontroller 262 which further includes a processing unit 2622 and a memory unit 2624. The memory unit 2624 could be realized with one or more standalone components connected to the microcontroller 262, or integrated with the microcontroller 262 as a single component. For example, the memory unit 2624 may be realized with the random access memory (RAM), the read-only memory (ROM), the flash memory, the optical disc, the hard disk drive, and/or the solid-state drive to store computer-executable instructions. The processing unit 2622 is configured to execute the instructions to determine whether one or more trigger events are received according to the detection results of the trigger detecting module 30. When the processing unit 2622 determines a trigger event is received, the processing unit 2622 configures the driving circuit 28 to drive the motor 20 accordingly. In this embodiment, the processing unit 2622 and the trigger detecting module 30 are connected through a bus 59. In other embodiments, the processing unit 2622 could also be connected to a position detecting module 52, a wireless signal receiving circuit 56, and/or other components through the bus 59 and/or through other suitable wired/wireless connections. The functions of the position detecting module 52 and the wireless signal receiving circuit 56 will be explained in more detail below. The microcontroller may be realized with an integrated circuit component, one or more discrete circuit components, and/or the collaboration of hardware and software. The predetermined time mentioned in some embodiments could be defined in the control device 24 as required, e.g., configured and stored in the memory unit 2624. However, it should be a sufficient period of time so that the control device 24 could recognize the situation when the moving speed of the lower end 12*a* of the covering material 12 decreases or even becomes 0.

The following paragraphs detail the mechanism of determining if the covering material 12 has been fully retracted or if it encounters resistance during the process of retracting.

Figure 3:
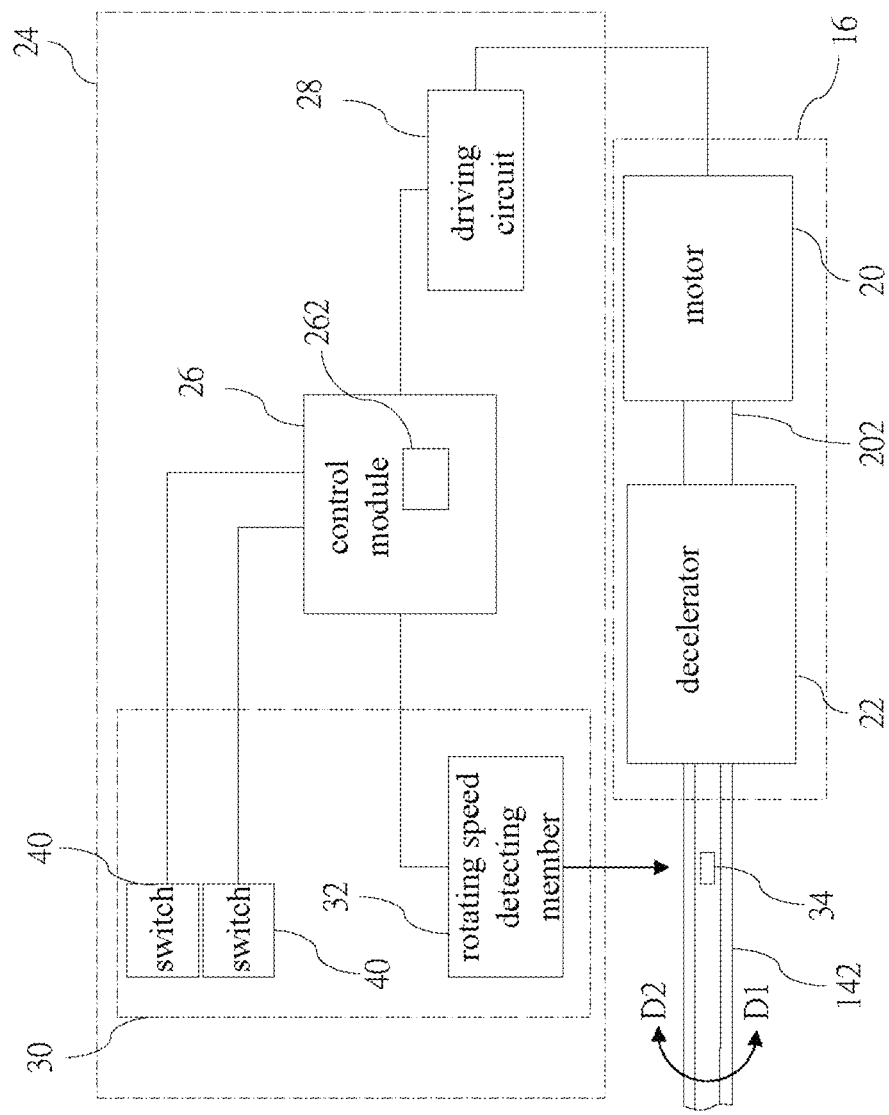
FIG. 3 is a schematic view showing the connections of an example control device of the electric window covering.

The trigger detecting module 30 includes a rotating speed detecting member 32, which is adapted to measure the rotating speed of the rotating member 14. In an embodiment, the rotating speed detecting member 32 is realized with a Hall sensor, and a magnet 34 is provided on the spindle 142 of the rotating member 14 as shown in FIG. 3. When the spindle 142 rotates, the rotating speed of the spindle 142 could be measured by calculating the changing of the magnetic field induction between the magnet 34 and the rotating speed detecting member 32.

Figure 5:
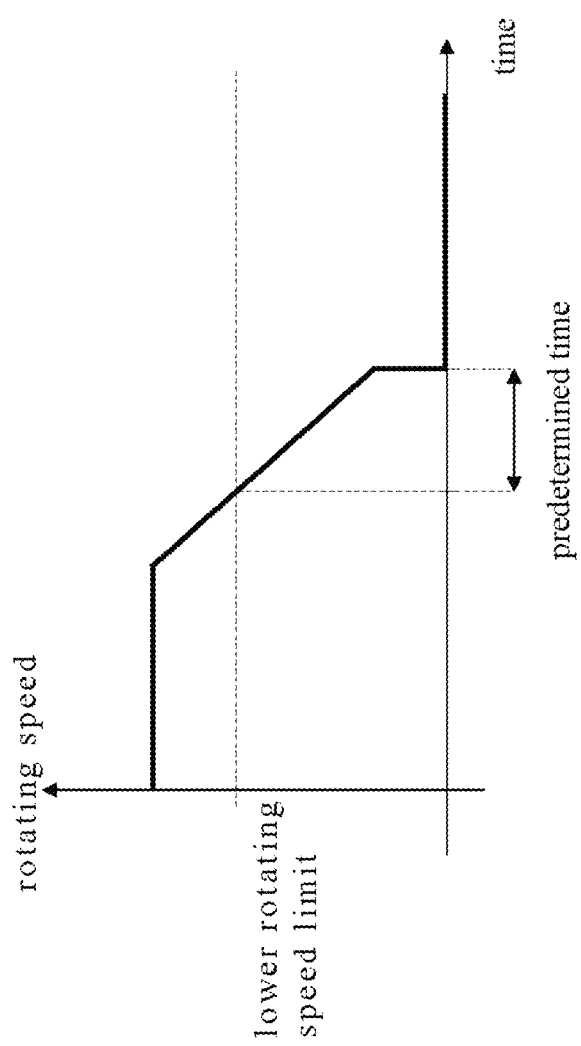
FIG. 5 is a time diagram showing the relation between the time and the rotating speed of an example rotating member of the electric window covering.
Figure 6:
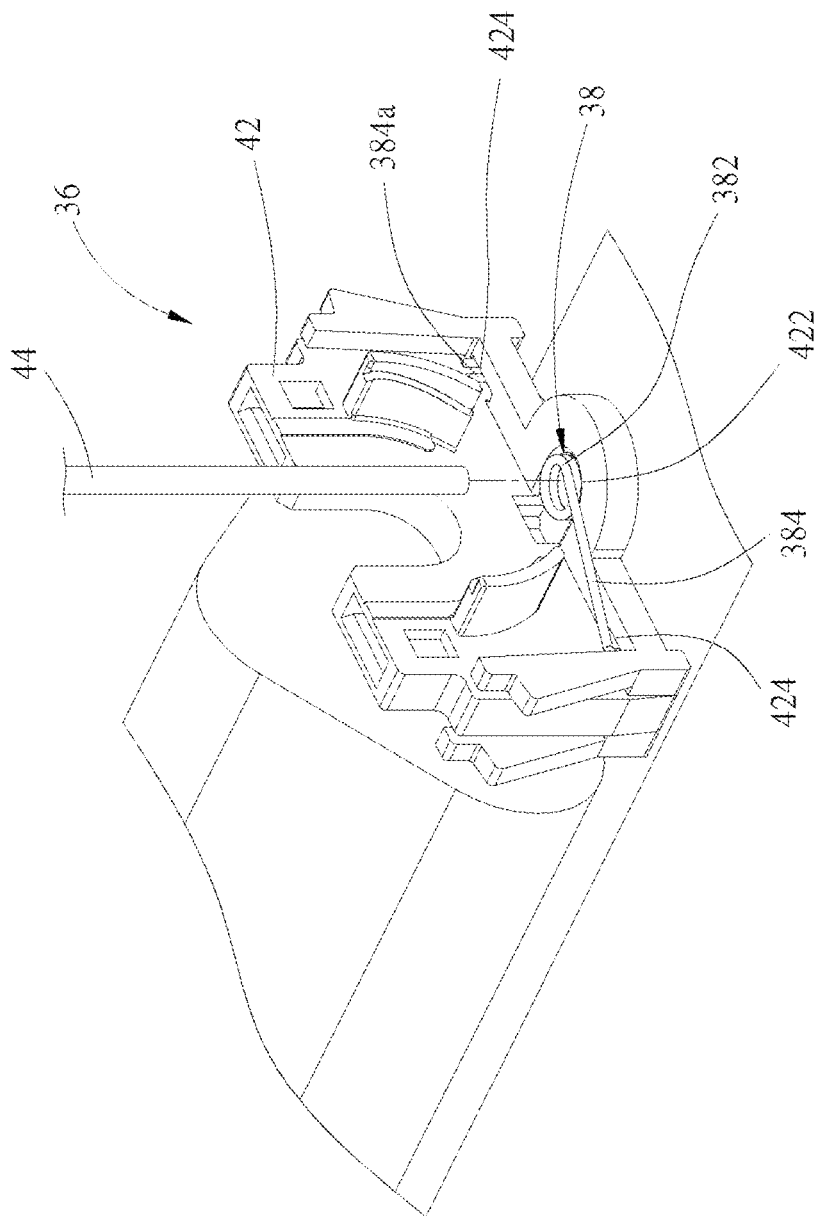
FIG. 6 is a perspective view of an example trigger detecting assembly located on the left side of the electric window covering.
Figure 7:
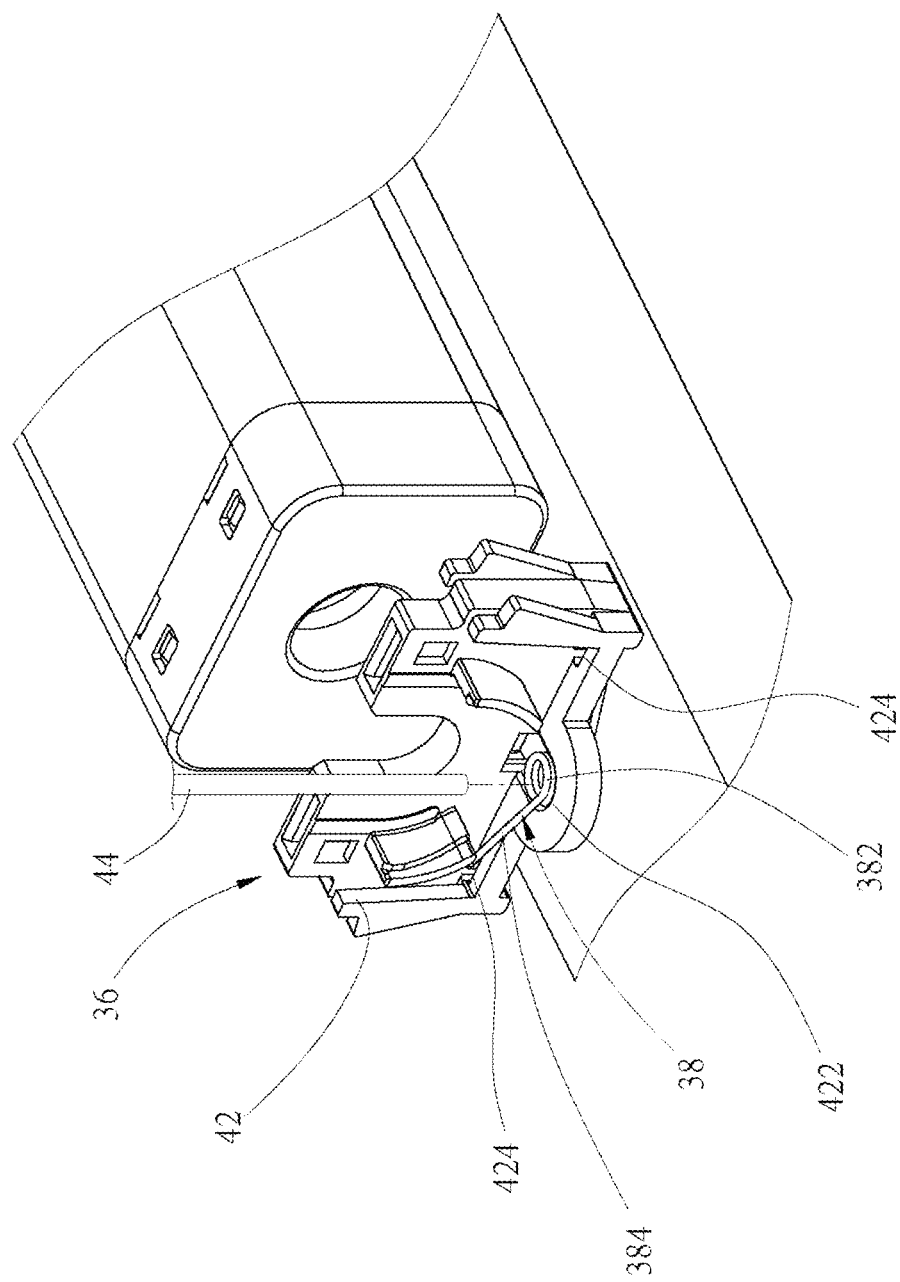
FIG. 7 is a perspective view of an example trigger detecting assembly located on the right side of the electric window covering.
Figure 8:
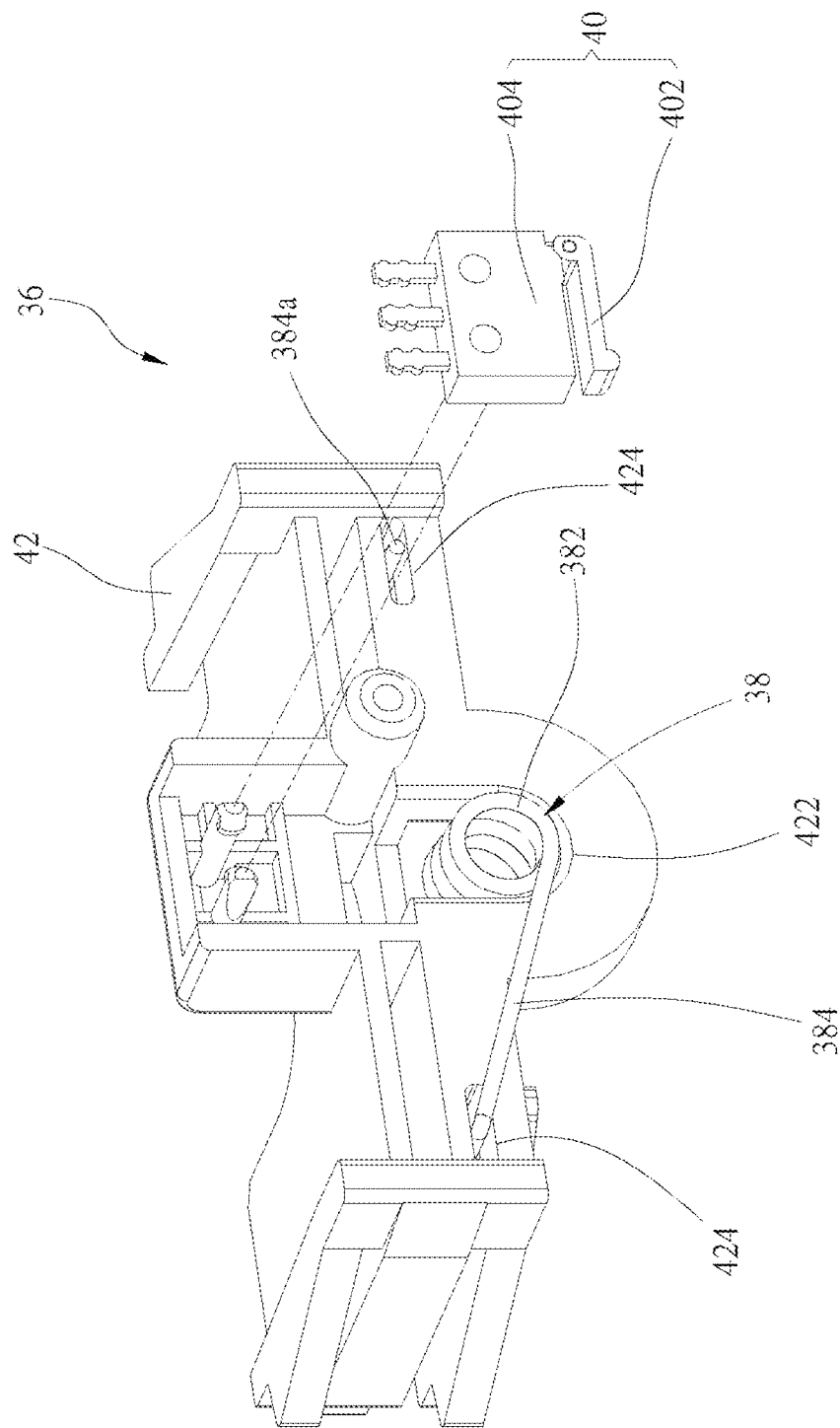
FIG. 8 is an exploded perspective view of the trigger detecting assembly located on the left side of the electric window covering.

A lower rotating speed limit for the rotating member 14 could be set in advance in the control module 26, as shown in FIG. 5. When the control module 26 configures the motor 20 to activate, driving the rotating member 14 to rotate in the first rotating direction D1 for retracting the covering material 12, the control module 26 would receive a signal of the rotating speed measured by the rotating speed detecting member 32. The rotation of the rotating member 14 would be hindered if the covering material 12 has been fully retracted and the cords 44 cannot be further retracted by the spools 144, or if the covering material 12 encounters resistance during the process of retracting, which prevents the cords 44 from being further retracted by the spools 144. As a result, the rotating speed of the rotating member 14 would decrease, and therefore the moving speed of the lower end 12*a* of the covering material 12 which is driven by the rotating member 14 would decrease as well. Once the rotating speed measured by the trigger detecting module 30 is lower than the lower rotating speed limit for the predetermined time, the control module 26 configures the motor 20 to stop. When the covering material 12 is fully retracted or bumps into a blocking object during the process of retracting, the control module 26 configures the motor 20 to stop rotating. If the rotating speed measured by the trigger detecting module 30 increases to a speed higher than the lower rotating speed limit within the predetermined time, the control module 26 would determine that the covering material 12 may encounter resistance for a brief moment. The moving speed of the lower end 12*a* of the covering material 12 would not be affected by the blocking object so the covering material 12 would be still able to retract normally. Therefore, the control module 26 could, through the driving circuit 28, configure the motor 20 to remain retracting. In an embodiment, the lower rotating speed limit is configured to be 50 percent of the original rotating speed of the motor, and the predetermined time is configured to be 100 ms to 200 ms.

In an embodiment, the magnet 34 could be provided on the spool 144 or the shaft 202 of the motor 20. A rotating speed of the shaft 202 of the motor 20 is higher than the rotating speed of the rotating member 14. When the magnet 34 is provided on the shaft 202 of the motor 20, the lower rotating speed limit should be adjusted to match the rotating speed of the shaft 202 of the motor 20. In other embodiments, the rotating speed detecting member 32 is provided on the shaft 202 of the motor 20, the rotating speed detecting member 32 could be realized with an encoder, a resolver, and/or other suitable detecting devices capable of measuring the rotating speed of the shaft 202 of the motor 20.

The following paragraphs detail the mechanism of determining if the covering material 12 has been fully expanded, or if it encounters resistance from a blocking object during the process of expanding.

Figure 2:
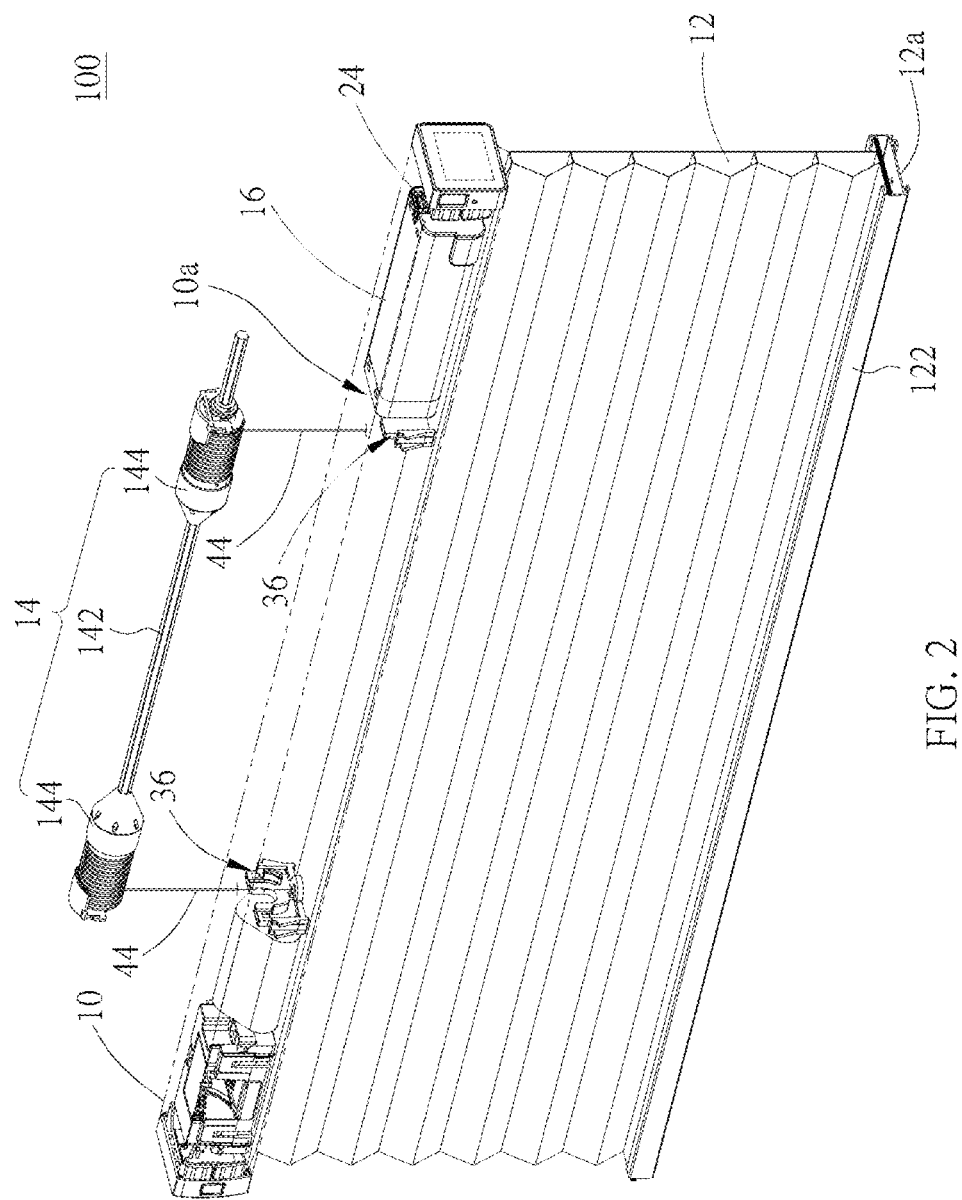
FIG. 2 is a partial exploded perspective view of the electric window covering in FIG. 1.

As shown in FIGS. 2 and 6-10, the trigger detecting module 30 further includes two trigger detecting assemblies 36 provided in a symmetric manner in the headrail 10, each of which is respectively located near one of the spools 144 (e.g., as shown in FIG. 2). The trigger detecting assemblies 36 have similar structures, e.g., FIGS. 6-7 respectively illustrate the trigger detecting assemblies 36 located on the left side and the right side of the headrail 10.

Please refer to the trigger detecting assembly 36 illustrated in FIGS. 2, 6-10. This trigger detecting assembly 36 includes a switch 40 and an elastic member 38, which is realized with a torsion spring in this embodiment. The torsion spring 38 includes a winding portion 382 and two extending arms 384 connected to the winding portion 382. An end of each of the extending arms 384 has a bent section 384*a*. The winding portion 382 is located above the cord hole 102 on the left side of the headrail 10, and the cord 44 passes through the winding portion 382 and the cord hole 102. The winding portion 382 forms a restricting ring which confines the cord 44 therein. The switch 40 has an operation rod 402 and a main body 404, wherein the switch 40 is electrically connected to the control module 26. As shown in FIG. 9, when the winding portion 382 of the torsion spring 38 is located at an original position (i.e., the cord 44 is at the predetermined cord position P0), the torsion spring 38 pushes the operation rod 402 to contact the main body 404 of the switch 40.

In an embodiment, each of the trigger detecting assemblies 36 further includes a fixing seat 42, which is fixed at the headrail 10, and the torsion spring 38 and the switch 40 are provided on the fixing seat 42. The fixing seat 42 has a receiving hole 422 and two narrow holes 424, wherein the receiving hole 422 is located above the cord hole 102. In a lateral direction of the headrail 10, the receiving hole 422 is located between the two narrow holes 424. The narrow holes 424 respectively extend in the lateral direction of the headrail 10 for a suitable length. The winding portion 382 is located in the receiving hole 422, and the bent sections 384a of the extending arms 384 are respectively received in one of the narrow holes 424. When the winding portion 382 moves in the longitudinal direction of the headrail 10, each of the bent sections 384a could be correspondingly moved in the narrow hole 424 respectively.

As shown in FIG. 9, during the process of expanding the covering material 12, a lowered length of the lower end 12a of the covering material 12 equals to the length of the cords 44 released due to the driving of the motor 20. Each of the cords 44 is taut, stays at the predetermined cord position P0, and exerts a force on the respective winding portion 382. The torsion spring 38 does not push the operation rod 402 to touch the main body 404, and the control module 26 configures the motor 20 to operate through the driving circuit 28, whereby the rotating member 14 could be rotated in the first rotating direction D1 or the second rotating direction D2 for retracting for or expanding the covering material 12.

Figure 10:
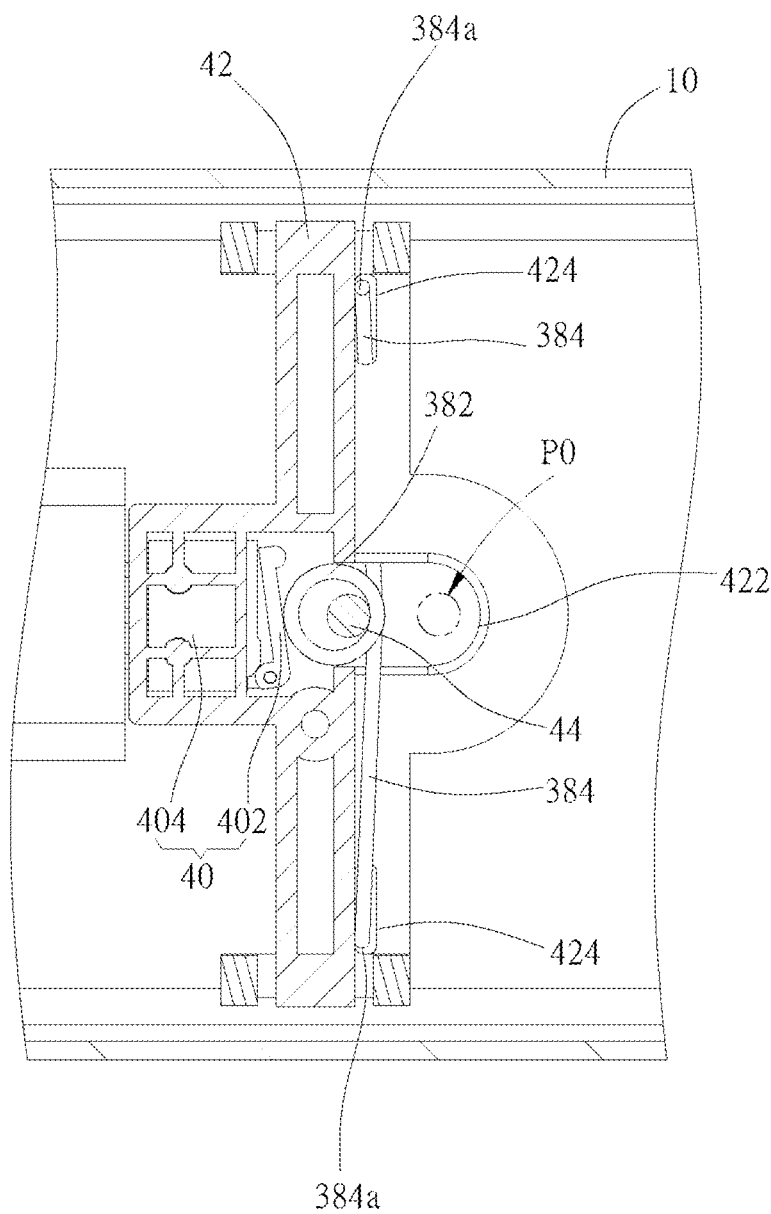
FIG. 10 is another schematic view showing the trigger detecting assembly when the cord is loose.

As shown in FIG. 10, when the length of the cord 44 fully released from the spool 144 is longer than the lowered length of the lower end 12a of the covering material 12, the cord 44 becomes loose. When the covering material 12 is fully expanded and the lower end 12a of the covering material 12 stops moving, the motor 20 may still drive the spools 144 to release the cords 44 for a period of time before the motor stops rotating. When the cords 44 are released after the lower end 12a of the covering material 12 stops moving, the cords 44 become loose and leave the predetermined cord positions P0. As a result, the cord 44 cannot exert force on the winding portions 382, and therefore the torsion spring 38 would return to its original position. When the torsion spring 38 returns to the original position, the winding portion 382 of the torsion spring 38 would push the operation rod 402 to touch the main body 404 and trigger the switches 40. The switches 40 transit from a first state into a second state, e.g., from an open circuit state to a short circuit state. After the switches 40 are activated, the control module 26 would accordingly configure the motor 20 to stop. In this way, when the covering material 12 is fully expanded, the motor 20 is configured to stop automatically. When the control module 26 configures the motor 20 to rotate in a direction of retracting the covering material 12, the control module 26 would ignore the current state of the switches 40 and reel in the cords 44. After the cords 44 are reeled by the motor 20 to an extent that the released length of the cords 44 equals the expanded length of the covering material 12, the cords 44 would move the lower end 12a of the covering material 12 in the direction of retracting or ascending.

During the process of expanding the covering material 12, if the covering material 12 bumps into a blocking object and the moving speed of the lower end 12a of the covering material 12 therefore decreases, the cords 44 would be still released by the motor 20. The moving speed of the lower end 12a of the covering material 12 would decrease (and even stop) for a predetermined time even if the cords 44 are still released. If the length of the cord 44 released by the motor 20 is greater than the current expanded length of the covering material 12, the cord 44 would become loose and does not push the torsion spring 38. The torsion spring 38 would return to its original position, and the winding portion 382 would push the operation rod 402 to activate the switch 40. As a result, the switch 40 would transit from a first state into a second state, e.g., from an open circuit state into a short circuit state. The control module 26 configures the motor 20 to stop if any of the switches 40 is activated, whereby to stop the covering material 12 from expanding or lowering. In this way, the covering material 12 could stop expanding when bumping into a blocking object during its expanding process, and therefore the covering material 12 or the blocking object wound not be damaged.

After the covering material 12 stops moving upon encountering a blocking object during its expanding, the control module 26 may configure the motor 20 to rotate in another direction for retracting or raising the covering material 12. The control module 26 would temporarily ignore the current state of the switches 40, and start to reel in the cords 44. When the length of the cords 44 released by the driving of the motor 20 equals the expanded length of the covering material 12, the cords 44 would move the lower end 12a of the covering material 12 in the retracting direction.

Figure 12:
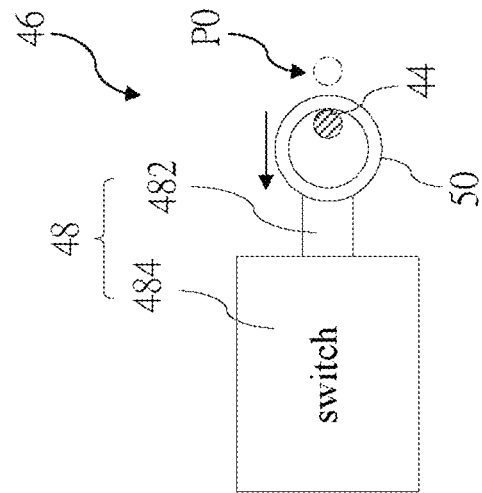
FIG. 12 is a schematic view showing the trigger detecting assembly in FIG. 11 when the cord is loose.
Figure 11:
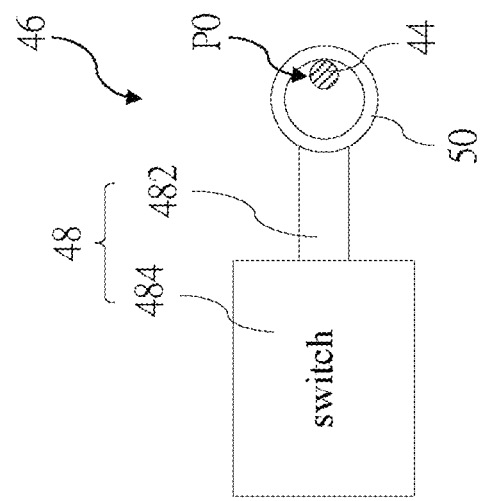
FIG. 11 is a schematic view showing another embodiment of the trigger detecting assembly of the present disclosure when the cord is taut.

Another embodiment of a trigger detecting assembly 46 of the present disclosure is shown in FIGS. 11-12, which can be also applied in the first embodiment of the electric window covering 100. The trigger detecting assembly 46 of this embodiment includes a switch 48 and a restricting ring 50, wherein the switch 48 has an operation rod 482 and a main body 484. The restricting ring 50 is connected to the operation rod 482. Each of the cords 44 respectively passes through one of the restricting ring 50. When the cord 44 is taut, the cord 44 is located at the predetermined cord position P0 and exerts a force on the restricting ring 50 in a direction away from the switch 48. The restricting ring 50 would pull the operation rod 482, making the switch 48 to be in a first state (e.g., open circuit). If the lower end 12a of covering material 12 reaches a fully expanded position or bumps into a blocking object, and such a situation lasts for a period of time, the cords 44 would become loose since the lengths of the cords 44 released by the motor 20 are greater than the expanded length of the covering material 12. The cord 44 does not push the restricting ring 50 in the direction away from the switch 48. An elastic member (not shown) inside the main body 484 of the switch 48 would drive the operation rod 482 to move toward the main body 484 for making the switch 48 be in a second state (e.g., short circuit). The control module 26 configures the motor 20 to stop when the switch 40 is in the second state. Whereby, the motor 20 is configured to stop when the covering material 12 is fully expanded or when the covering material 12 bumps into a blocking object during the process of expanding.

As mentioned above, the control device of the electric window covering provided in the present disclosure configures the motor to stop when the moving speed of the lower end of the covering material decreases for a predetermined time. The motor could be configured to stop the covering material from further moving in each of the following situations: when the covering material is expanded to the fully expanded position; when the covering material is retracted to the fully retracted position; or when the covering material encounters resistance during the process of expanding or retracting. With such a design, the process and components required for setting up the upper and lower limits could be reduced or even omitted. Furthermore, if the covering material bumps into a blocking object during its movement, it could be prevented from further colliding with the blocking object or getting damaged. In addition, the above-mentioned embodiments are realized with two trigger detecting assemblies. In other embodiments, the number of the trigger detecting assemblies could be configured to be one or more according to different design considerations.

In the embodiments below, an example embodiment of a control method of the electric window covering 100 of the present disclosure is disclosed, which would allow a user to control the movement of the covering material by interacting with the covering material, e.g., to expand, retract, or stop the covering material.

Figure 13:
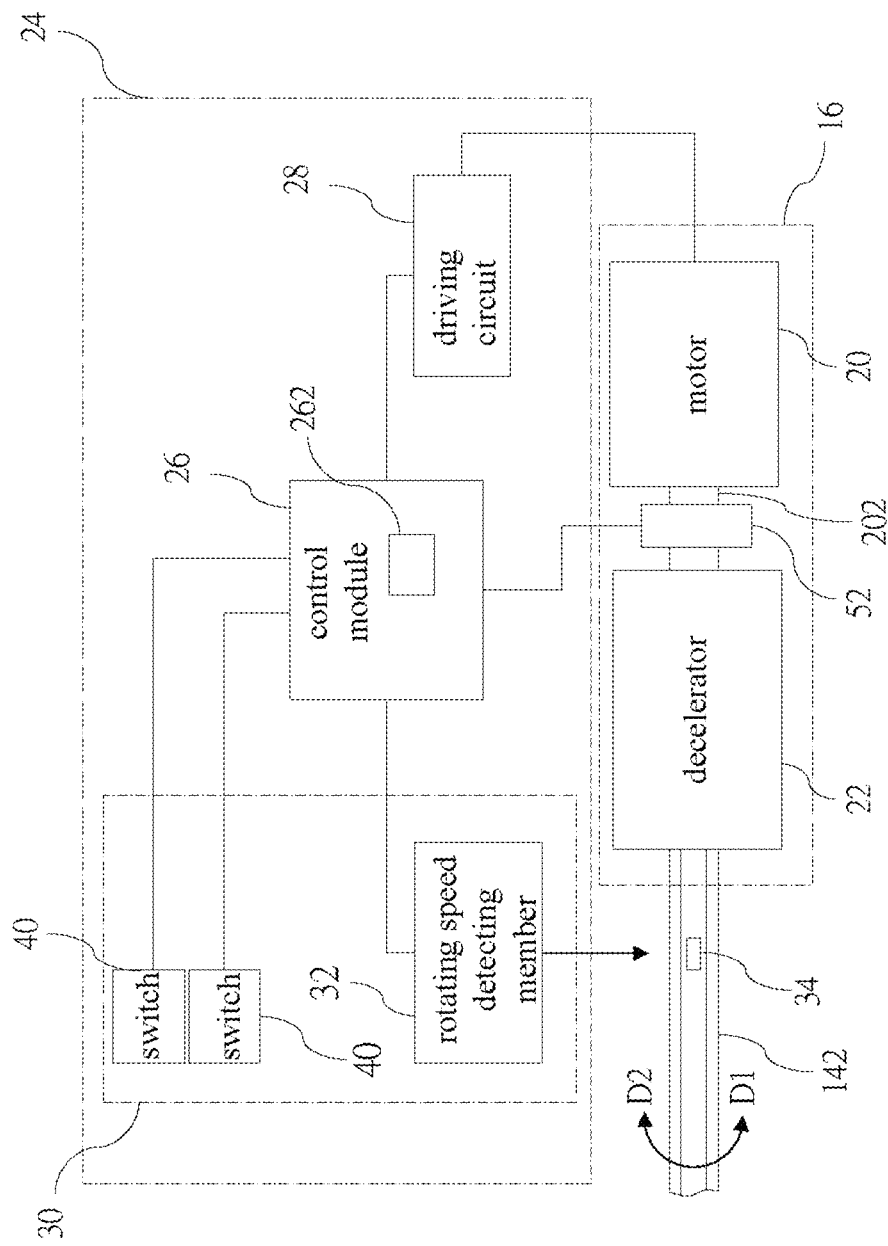
FIG. 13 is a schematic view showing another embodiment of the control device of the present disclosure.

FIG. 13 is a schematic view of another embodiment of the control device of the present disclosure. In this embodiment, most of the components of the window covering are similar to the counterparts in the previous embodiment. The electric window covering of this embodiment further includes a position detecting module 52. For example, the position detecting module 52 may be realized with an encoder, provided on the shaft 202 of the motor 20 and connected to the microcontroller 262 of the control module 26. When the shaft 202 of the motor 20 rotates, the encoder may detect the revolutions of the shaft 202 of the motor 20 and generate a corresponding signal representing the number of revolutions, which is then transmitted to the control module 26. When the covering material 12 is fully expanded, the position of the lower end 12a of the covering material 12 is defined as a first predetermined position P1 (as shown in FIG. 1). When the covering material 12 is fully retracted, the position of the lower end 12a of the covering material 12 is defined as a second predetermined position P2. The lower end 12a of the covering material 12 could be moved upward to the first predetermined position P1 in a first moving direction or downward to the second predetermined position P2 in a second moving direction. When the lower end 12a of the covering material 12 moves from the first predetermined position P1 to the second predetermined position P2, the number of revolutions Nr of the shaft 202 of the motor 20 may be detected by the position detecting module 52 (e.g.,—encoder). Accordingly, the control module 26 may determine the position of the lower end 12a of the covering material 12 according to a ratio between the number of revolutions Nr and another number of revolutions Nx of the shaft 202 of the motor 20 detected by the position detecting module 52 when the lower end 12a of the covering material 12 moves.

In other embodiments, the position detecting module 52 may also be realized with one or more encoders and/or resolvers provided on the shaft 202 of the motor 20 and/or the spindle 142.

Figure 4:
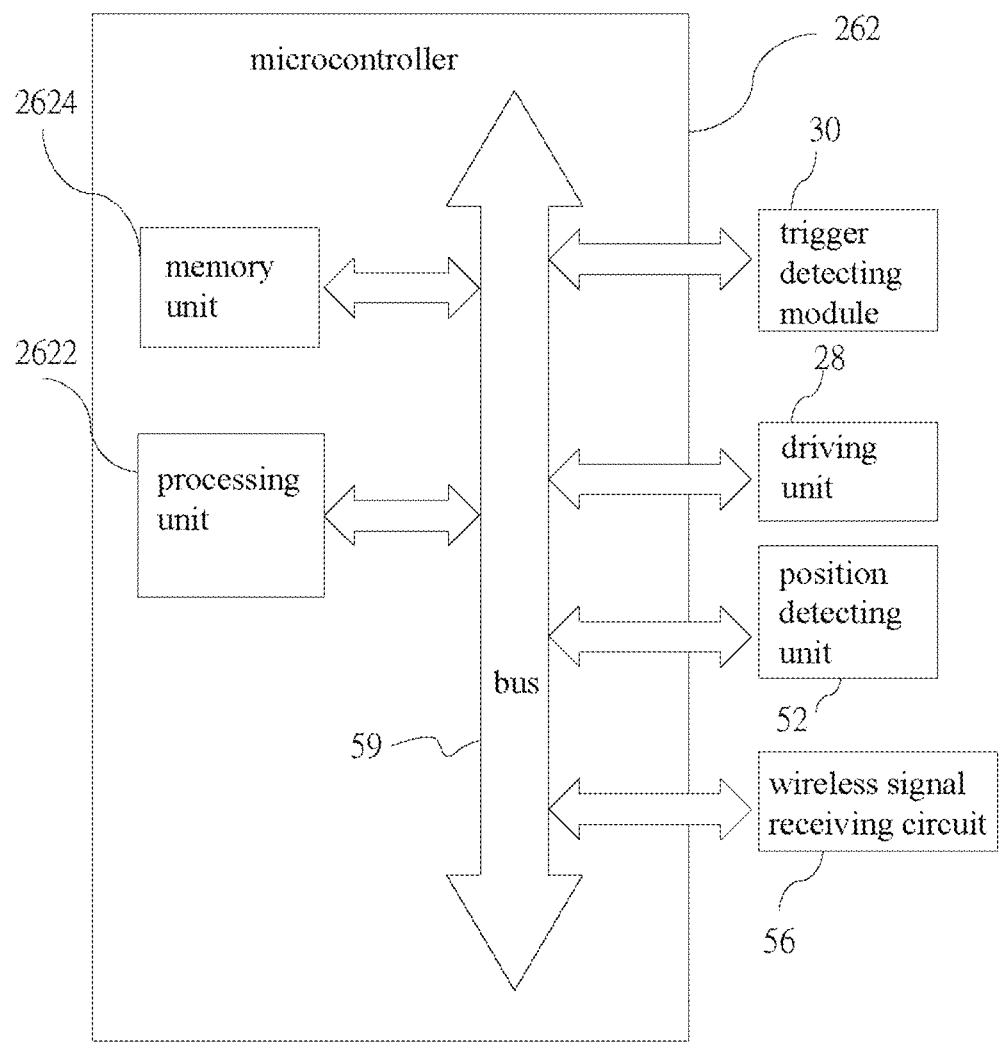
FIG. 4 is a schematic view of an example microcontroller of the electric window covering.
Figure 14:
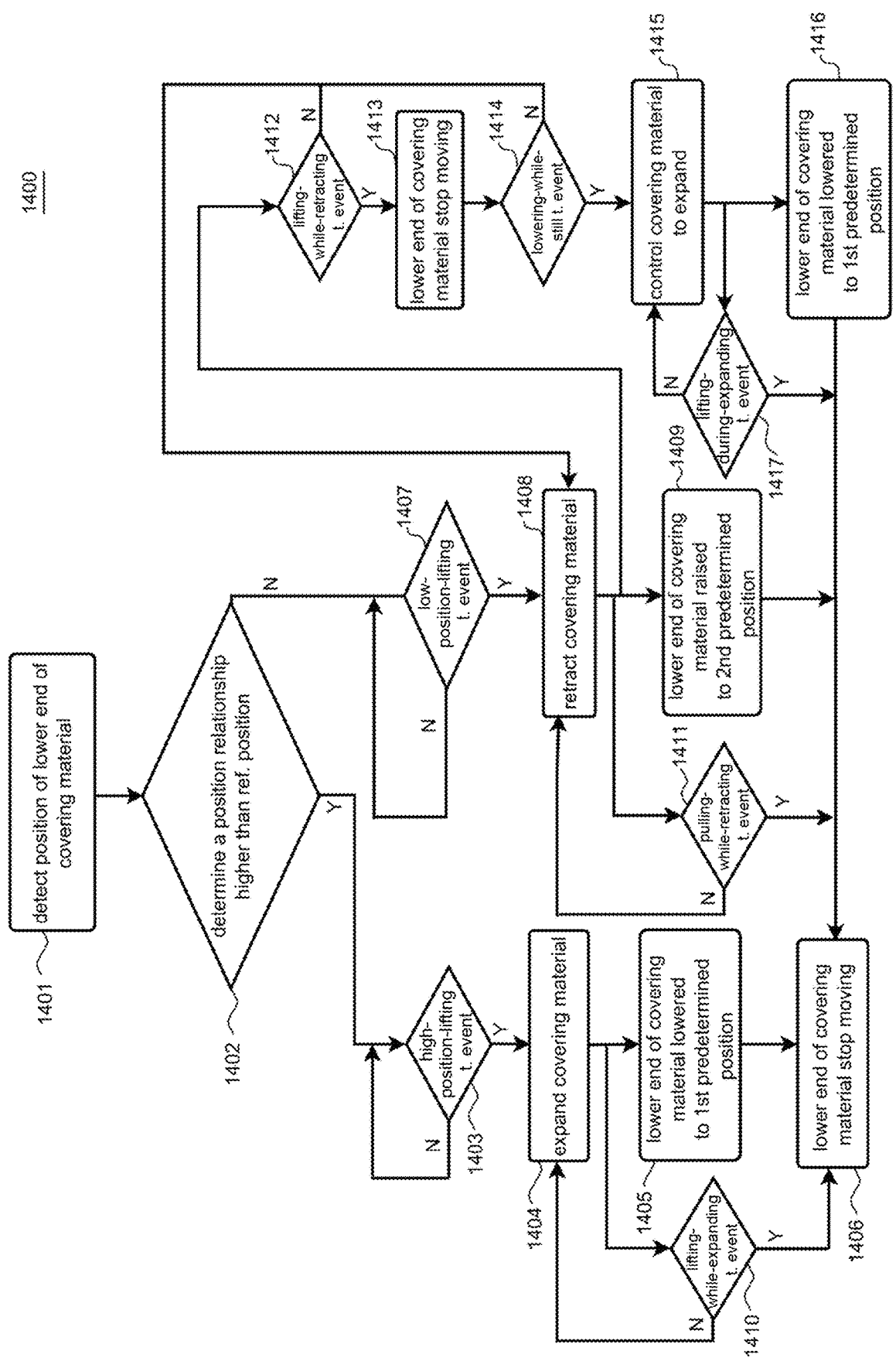
FIG. 14 is a flow chart of an embodiment of a control method of the electric window covering of the present disclosure.

As shown in FIG. 4, computer-executable instructions are stored in the memory unit 2624 of the microcontroller 262. The processing unit 2622 of the microcontroller 262 receives the detected data (e.g., the detected data generated by the trigger detecting module 30 and the position detecting module 52) and executes the computer-executable instructions to perform the control method 1400 of this embodiment. The control method 1400 includes the following steps which are also shown in FIG. 14.

Step 1401: The position detecting module 52 detects the position of the lower end 12a of the covering material 12 and accordingly generates a position information of the lower end 12a of the covering material 12.

The position detecting module 52 may continuously or intermittently detect the position of the lower end 12a of the covering material 12, or may detect the position of the lower end 12a of the covering material 12 only when the lower end 12a of the covering material 12 is moved or stopped. The position information may be generated in a suitable format, e.g., one or more analog waveforms and/or one or more digital messages. In an embodiment, the position detecting module 52 is realized with an encoder of the motor 20. When the lower end 12a of the covering material 12 stops moving, the number of revolutions of the motor 20 during the moving of the lower end 12a of the covering material 12 may be detected by the encoder. The encoder generates a corresponding number of pulses as the position information. The position information may be transmitted to the processing unit 2622 and stored in the memory unit 2624.

Step 1402: The processing unit 2622 determines a position relationship by comparing the position information with a reference position Pa.

In the above embodiment, the position information is a number of pulses generated by the encoder of the motor 20. By comparing the number of pulses generated by the encoder with a reference pulses number representing the reference position Pa, the processing unit 2622 determines a position relationship indicating whether the current position of the lower end 12a of the covering material 12 is higher than the reference position Pa. When the position relationship shows the position of the lower end 12a of the covering material 12 is higher than the reference position Pa, the processing unit 2622 stores a first flag in the memory unit 2624. When the position relationship shows the position of the lower end 12a of the covering material 12 is lower than the reference position Pa, the processing unit 2622 stores a second flag in the memory unit 624. For example, the first flag and the second flag may be configured to be the same bit of a message respectively stored as 1 or 0, or configured to be different bits of a message. In this embodiment, the reference position Pa is configured to be the second predetermined position P2. In other embodiments, the reference position Pa could be configured to be a suitable position between the first predetermined position P1 and the second predetermined position P2. For example, the reference position Pa may be configured to be a position above the midpoint of the first predetermined position P1 and the second predetermined position P2.

Step 1403: When the lower end 12a of the covering material 12 is higher than the reference position Pa and/or the first flag is stored in the memory unit 2624, the microcontroller 262 determines that a high-position-lifting trigger event is received when the covering material 12 is moved by a high-position-lifting external force.

In this embodiment, when the lower end 12a of the covering material 12 is stopped, the trigger detecting assemblies 36 of the trigger detecting module 30 detect the condition of the cords 44, and generate a high-position-lifting detecting result when the covering material 12 is moved by the high-position-lifting external force. For example, when the trigger detecting module 30 detects the cords 44 change from taut to loose, the trigger detecting module 30 generates the high-position-lifting detecting result. The microcontroller 262 determines the high-position-lifting trigger event is received according to the high-position-lifting detecting result. For example, the high-position-lifting trigger event may be invoked when the lower end 12a of the covering material 12 is lifted by the high-position-lifting external force and then lowered from the lifted position.

Figure 15:
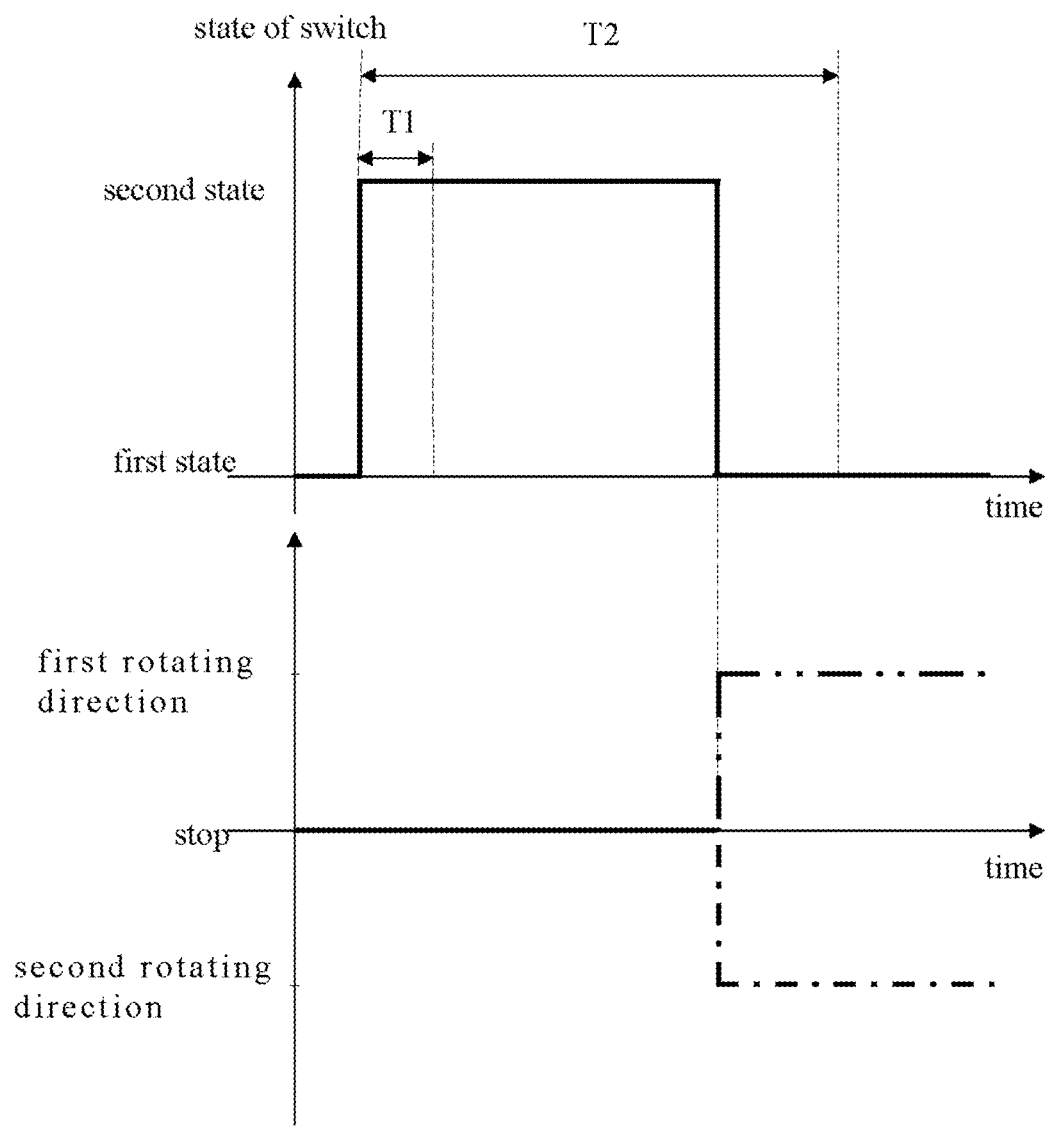
FIG. 15 is a time diagram showing an embodiment of detecting the high-position-lifting trigger and the low-position-lifting trigger events according to the control method in FIG. 14.

As shown in the embodiment in FIG. 15, the time diagram shows the lower end 12a of the covering material 12 is lifted and then lowered when the lower end 12a of the covering material 12 stops. When the lower end 12a of the covering material 12 stops, the cords 44 are taut and the switches 40 of the trigger detecting assemblies 36 are in the first state. When a user lifts the lower end 12a of the covering material 12, the cords 44 become loose from taut and the switches 40 turn into the second state from the first state. When the user puts down the lower end 12a of the covering material 12, the cords 44 change from loose to taut and the switches 40 return to the first state from the second state. According to the states of the switches 40, the processing unit 2622 determines whether the lower end 12a of the covering material 12 is deliberately moved by the high-position-lifting external force. After turning from the first state to the second state, if the switches 40 stay in the second state for more than a first predetermined lifting time T1 and then turn back to the first state within a predetermined lowering time T2, the processing unit 2622 determines the lower end 12a of the covering material 12 is deliberately moved by the high-position-lifting external force. Accordingly, the processing unit 2622 determines the high-position-lifting trigger event is received. If the above timing requirements of the switch 40 are not met, the processing unit 2622 determines that the lower end 12a of the covering material 12 is not moved by the high-position-lifting external force to invoke the high-position-lifting trigger event. For example, the lower end 12a of the covering material 12 may be blown by the wind and hung on the furniture. The processing unit 2622 and the trigger detecting assemblies 36 of the trigger detecting module 30 may continuously or intermittently monitor the cords 44 for detecting the high-position-lifting trigger event.

Figure 16:
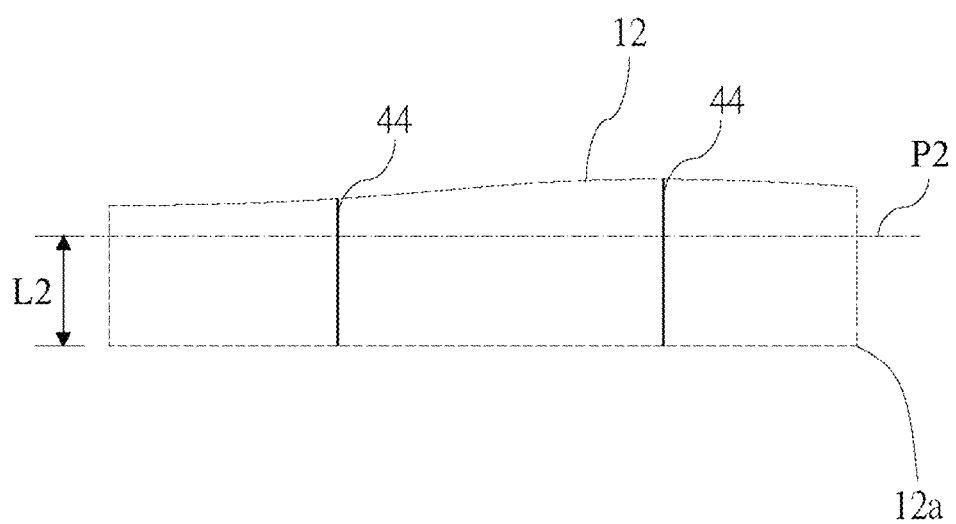
FIG. 16 is a schematic view showing that the lower end of the covering material is close to the second predetermined position.
Figure 17:
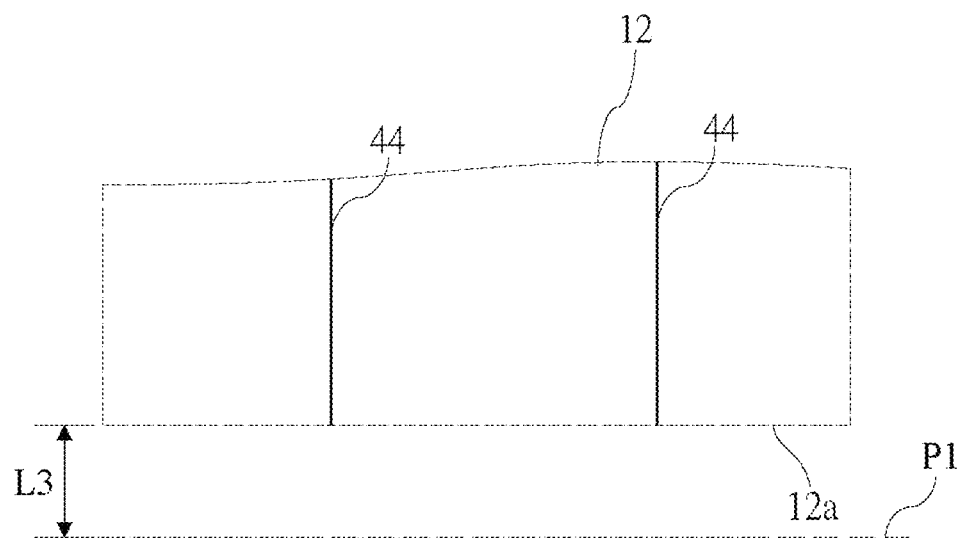
FIG. 17 is a schematic view showing that the lower end of the covering material is close to the first predetermined position.

In some embodiments, the first predetermined lifting time T1 can be configured to a suitable interval between 0.1 and 0.5 second, and the predetermined lowering time T2 can be configured to a suitable interval between 3 and 15 seconds. The first predetermined lifting time T1 and the predetermined lowering time T2 may also be adjusted in accordance with the current position of the lower end 12a of the covering material 12. Specifically, when the lower end 12a of the covering material 12 is at positions where the change in the tension of the cords 44 cannot be easily detected (e.g., in regions near the first predetermined position P1 or the second predetermined position P2), the first predetermined lifting time T1 may be configured to be smaller. By configuring the first predetermined lifting time T1 to be smaller, it is easier to meet the requirement for invoking the high-position-lifting trigger event. On the other hand, when the lower end 12a of the covering material 12 is at positions where the change in the tension of the cords 44 can be easily detected, the first predetermined lifting time T1 may be configured to be a little bit longer. Therefore, the sensitivity of the detecting the high-position-lifting trigger event may be adjusted to a suitable level to reduce the false alarm and unexpectedly movements of the lower end 12a of the covering material 12. In another embodiment, as shown in FIG. 16, when the lower end 12a of the covering material 12 is near the second predetermined position P2, the released lengths of the cords 44 are relatively short. Due to the limited lengths, the cords 44 would not easily become loose even when the lower end 12a of the covering material 12 is lifted. Therefore, when the lower end 12a of the covering material 12 is within a second distance L2 (e.g., 2 cm) below the second predetermined position P2, the first predetermined lifting time T1 can be configured to be smaller (e.g., 0.1 second), and the predetermined lowering time T2 can be configured to be 10 seconds, whereby to increase the sensitivity for detecting the high-position-lifting trigger event. In another embodiment, as shown in FIG. 17, when the lower end 12a of the covering material 12 is near the first predetermined position P1, the released lengths of the cords 44 are relatively long. Due to the longer lengths, it takes a longer time for the trigger detecting module 30 to detect the cords 44 are loose when the lower end 12a of the covering material 12 is lifted. Therefore, when the lower end 12a of the covering material 12 is located within a third distance L3 (e.g., 2 cm) above the first predetermined position P1, the first predetermined lift time T1 can also be configured to be smaller (e.g., 0.15 second), and the predetermined lowering time T2 can be configured to be 10 seconds, whereby to increase the sensitivity for detecting the high-position-lifting trigger event. In another embodiment, when the lower end 12a of the covering material 12 is not near the predetermined positions P1 and P2 (e.g., away from the predetermined positions P1 and P2 respectively for more than the distances L3 and L2), the sensitivity for detecting the high-position-lifting trigger event may be decreased. For example, the first predetermined lifting time T1 can be configured to be 3 seconds, and the predetermined lowering time T2 can be configured to be 10 seconds, whereby to prevent false trigger events. In another embodiment, the lengths of the second distance L2 and the third distance L3 can also be adjusted and/or configured to be the same or different for adjusting the sensitivity for detecting the high-position-lifting trigger event.

In this embodiment, if the switches 40 are turned into the second state, and are not turned back to the first state within the predetermined lowering time T2, it means that the lower end 12a of the covering material 12 may be hindered by another object and therefore is continuously lifted, causing the cords 44 to stay in a loose state. In such a situation, the processing unit 2622 determines that the requirement for the high-position-lifting trigger event is not met even if the switches 40 are not turned back to the first state within the predetermined lowering time T2.

Step 1404: The covering material is configured to expand according to the high-position-lifting trigger event.

In this embodiment, the microcontroller 262 is configured to transmit a signal to activate the motor 20 when determining the first high-position-lifting trigger event is received based on the high-position-lifting detecting result, e.g., according to the first flag stored in the memory unit 2624. The rotating member 14 driven by the motor 20 rotates in the second rotating direction D2 for moving the lower end 12a of the covering material 12 toward the first predetermined position P1 and expanding the covering material 12.

Steps 1405 and 1406: During the process of the expanding the covering material 12, when the lower end 12a of the covering material 12 is lowered to the first predetermined position P1, the lower end 12a of the covering material 12 is configured to stop moving.

When the lower end 12a of the covering material 12 reaches the first predetermined position P1 (i.e., when the covering material 12 is fully expanded), the cords 44 may become loose from taut and the switches 40 may turn from the first state into the second state.

Figure 20:
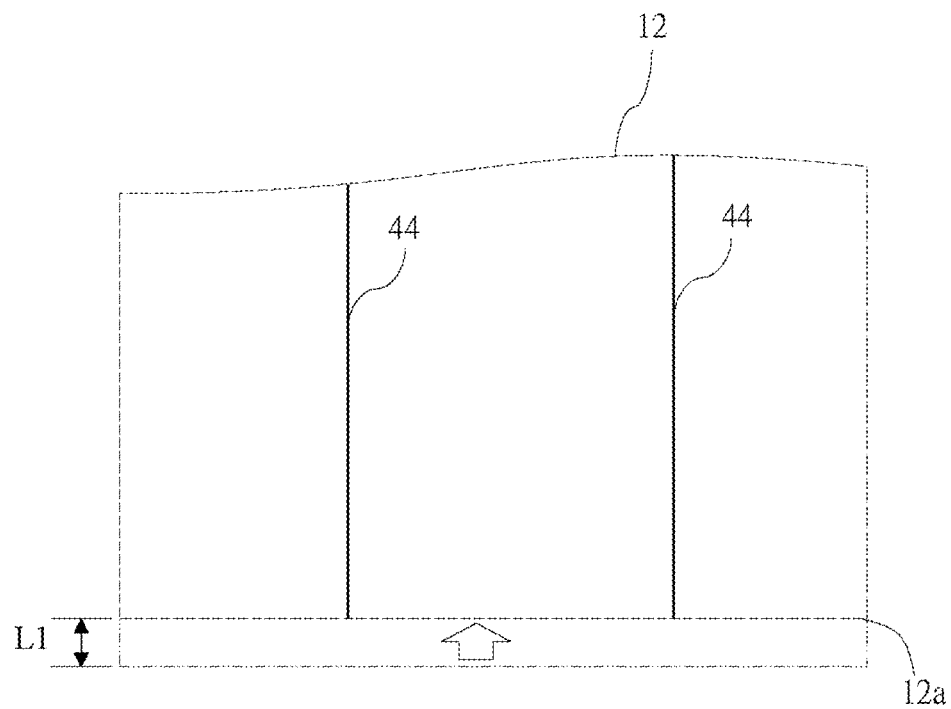
FIG. 20 is a schematic view showing the lower end of the covering material is moved upward for a first distance.

The microcontroller 262 receives the state changing signal of the switches 40 and accordingly stops the motor 20 from rotating. In another embodiment, when the lower end 12a of the covering material 12 reaches the first predetermined position P1 (i.e., when the covering material 12 is fully expanded), the cords 44 may become loose from taut and the switches 40 turn from the first state into the second state. The microcontroller 262 receives the state changing signal of the switches 40 and accordingly determines that the lower end 12*a* of the covering material 12 has reached the first predetermined position P1. After the microcontroller 262 configures the motor 20 to stop rotating, the microcontroller 262 configures the motor 20 to rotate in the first rotating direction D1 until the cords 44 become taut again, which makes the switches 40 turn from the second state to the first state. After the cords 44 become taut, the microcontroller 262 configures the motor 20 to stop rotating. The lower end 12*a* of the covering material 12 can be maintained at substantially the first predetermined position P1, or moved to a position above the first predetermined position P1 with a first distance L1 (as shown in FIG. 20). In another embodiment, the processing unit 2622 is configured to determine if the lower end 12*a* of the covering material 12 has reached the first predetermined position P1 based on the position information detected by the encoder 52. When the encoder 52 detects the lower end 12*a* of the covering material 12 reaches the first predetermined position P1, the motor 20 is configured to rotate in the first rotating direction D1 for moving the lower end 12*a* of the covering material 12 the first distance L1.

Step 1407: When the lower end 12*a* of the covering material 12 is lower than the reference position Pa and/or the second flag is stored in the memory unit 2624, the microcontroller 262 determines that a low-position-lifting trigger event is received when the covering material 12 is moved by a low-position-lifting external force.

In this embodiment, the detections and the determinations of the low-position-lifting trigger event for the covering material 12 are similar to those in Step 1403.

The microcontroller 262 transmits a signal to activate the motor 20 when determining the low-position-lifting trigger event is received based on a low-position-lifting detecting result and/or the second flag saved in the memory unit 2624.

Step 1408: The lower end 12*a* of the covering material 12 is configured to retract according to the low-position-lifting trigger event.

The motor 20 drives the rotating member 14 to rotate in the first rotating direction D1 for moving the lower end 12*a* of the covering material 12 toward the second predetermined position P2 and retracting the covering material 12.

Step 1409: When the lower end 12*a* of covering material 12 raises to reach the second predetermined position P2 during the process of retracting the covering material 12, the control method 1400 goes to Step 1406.

When the lower end 12*a* of the covering material 12 reaches the second predetermined position P2 (i.e., when the covering material 12 is fully retracted), the processing unit 2622 determines that the lower end 12*a* of the covering material 12 has reached the second predetermined position P2 according to the detecting signal of the rotating speed detecting member 32, which indicates that the rotating speed of the rotating member 14 is lower than a lower rotating speed limit for a predetermined time. In another embodiment, the processing unit 2622 determines if the lower end 12*a* of the covering material 12 has reached the second predetermined position P2 according to the position information detected and generated by the encoder 52.

Thus, the microcontroller 262 configures the motor 20 to stop rotating and the lower end 12*a* of covering material 12 to stop moving (Step 1406). In the processing of performing Step 1403 to Step 1409, if the lower end 12*a* of the covering material 12 stops moving, the control method 1400 goes back to Step 1401 to detect the position of the lower end 12*a* of the covering material 12, and detects whether the high-position-lifting trigger event or the low-position-lifting trigger event is received.

When the lower end 12*a* of the covering material 12 does not move, the user could utilize the method 1400 to generate the high-position-lifting trigger event or the low-position-lifting trigger event for expanding or retracting the covering material 12.

Please refer to FIG. 14. The control method 1400 of the present disclosure can further include the features below.

Step 1410: The microcontroller 262 determines that a lifting-while-expanding trigger event is received during the process of expanding the covering material 12.

Figure 18:
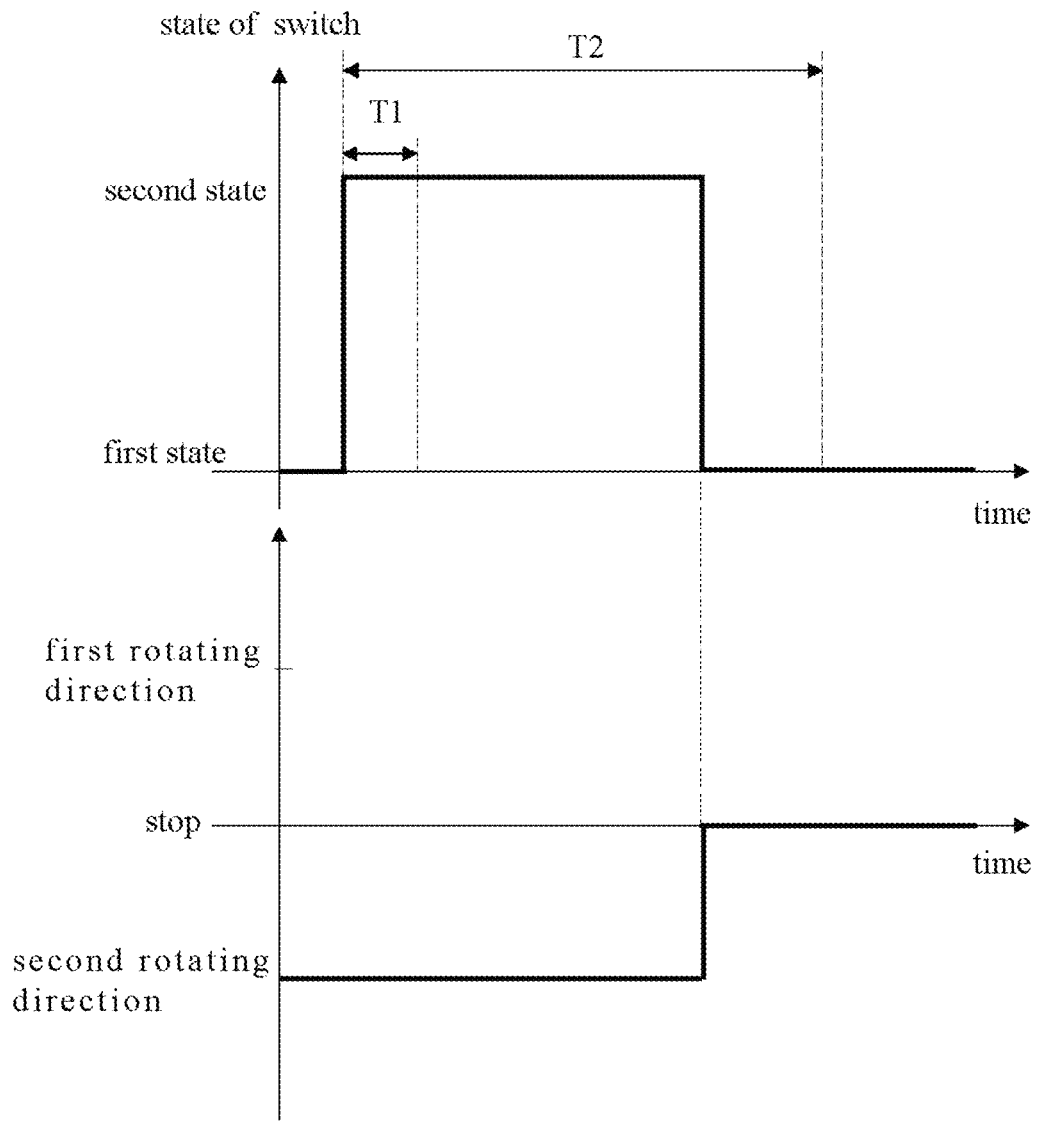
FIG. 18 is a time diagram showing an embodiment of detecting the lifting-while-expanding trigger event according to the control method in FIG. 14.

During the process of expanding the covering material 12, the trigger detecting assemblies 36 may detect and generate a lifting-while-expanding detecting result when detecting the covering material 12 is lifted by a lifting-while-expanding external force and lowered. The microcontroller 262 determines a lifting-while-expanding trigger event is received according to the lifting-while-expanding detecting result. As shown in FIG. 18, while the rotating member 14 is rotating in the second rotating direction D2, the microcontroller 262 determines that the lifting-while-expanding trigger event is received if the lifting-while-expanding detecting result shows that the lower end 12*a* of the covering material 12 is lifted by an external force (i.e., the lifting-while-expanding external force) and then lowered. In this embodiment, determining the lifting-while-expanding trigger event is similar to determining the high-position-lifting trigger event in the previous embodiments. The processing unit 2622 determines the lifting-while-expanding trigger event is received if the switches 40 turn from the first state into the second state for longer than the first predetermined lifting time T1 (which implies that the lower end 12*a* of the covering material 12 is lifted by the user, and such a situation lasts for longer than the first predetermined lifting time T1), and then switch from the second state back to the first state within the predetermined lowering time T2 (which implies that the lower end 12*a* of the covering material 12 is put down by the user).

When the lifting-while-expanding trigger event is received, the control method 1400 goes to Step 1406. The microcontroller 262 configures the lower end 12*a* of the covering material 12 to stop and stays at its current position. Afterward, the control method 1400 goes back to Step 1401.

Figure 19:
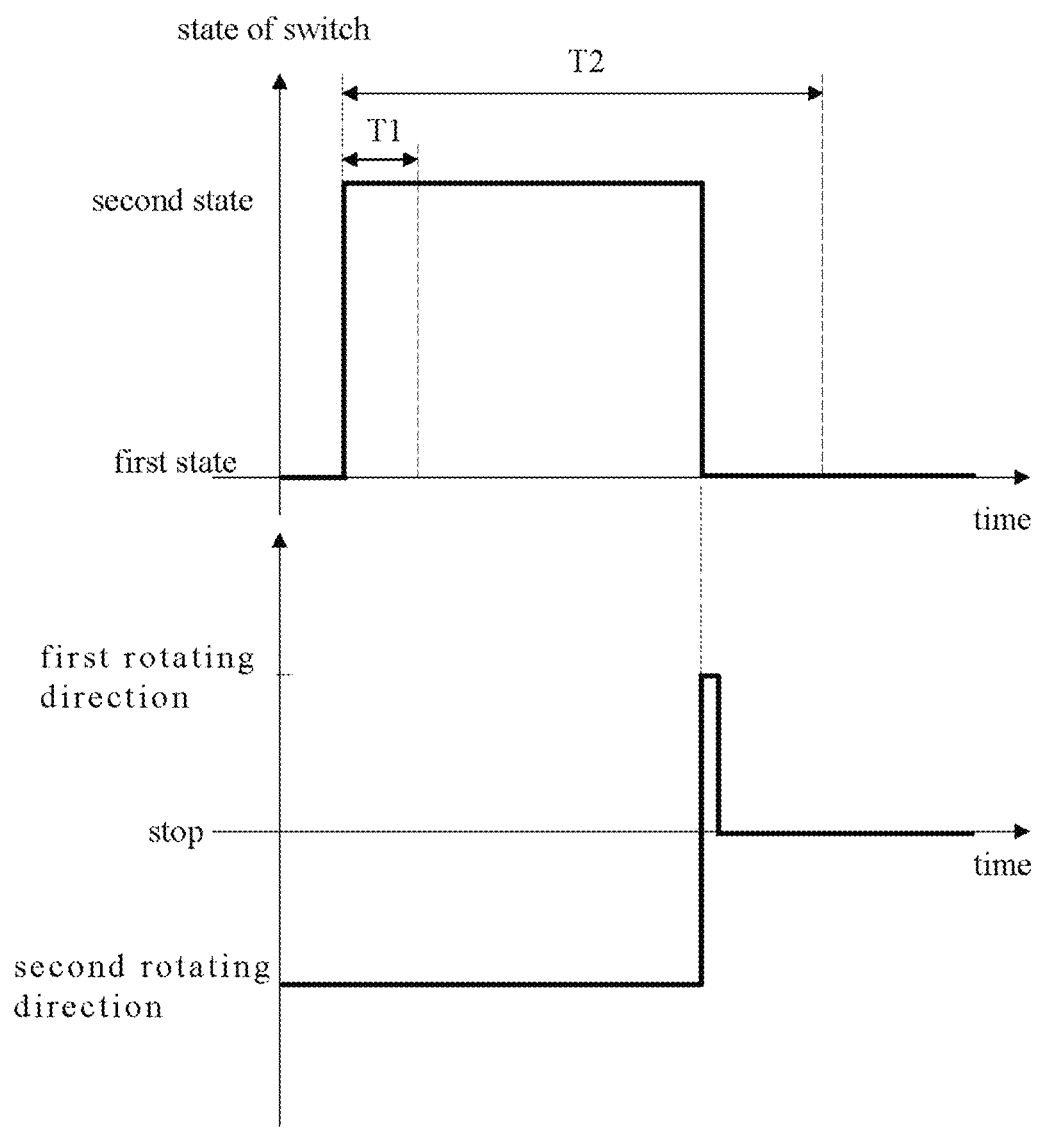
FIG. 19 is a time diagram showing another embodiment of detecting the lifting-while-expanding trigger event according to the control method in FIG. 14.

FIGS. 19-20 collectively show another embodiment of detecting the lifting-while-expanding trigger event. After the microcontroller 262 stops the motor 20 and the rotating member 14 from rotating in the second rotating direction D2, the microcontroller 262 configures the motor 20 to drive the rotating member 14 is configured to rotate for predetermined rotations, a predetermined angle or a predetermined time in the first rotating direction D1 and then stop. Thus, the cords 44 are retracted to move the lower end 12*a* of the covering material 12 upward for a first distance L1 for making sure the cords 44 remain taut. The predetermined rotations, the predetermined angle or the predetermined time may correspond to a predetermined number of pulses generated by the encoder 52. The microcontroller 262 configures the motor 20 according to the position information detected by the encoder 52 for driving the rotating member 14 to rotate. The microcontroller 262 configures the motor 20 to stop when the position information detected by the encoder 52 represents the lower end 12*a* of the covering material 12 has been moved upward for the first distance L1 (i.e., the number of the pulses generated by the encoder 52 equals the predetermined number of pulses).

If the switches 40 turn to the second state from the first state, but do not turn back to the first state within the predetermined lowering time T2, it implies that the lower end 12*a* of the covering material 12 encounters an object and therefore keeps lifted. Thus, the microcontroller 262 configures the motor 20 and therefore the rotating member 14 to stop from rotating. After the switches 40 turn back to the first state, the control method 1400 goes back to Step 1401.

Step 1411: The microcontroller 262 determines that a pulling-while-retracting trigger event is received during the process of retracting the covering material 12.

Figure 21:
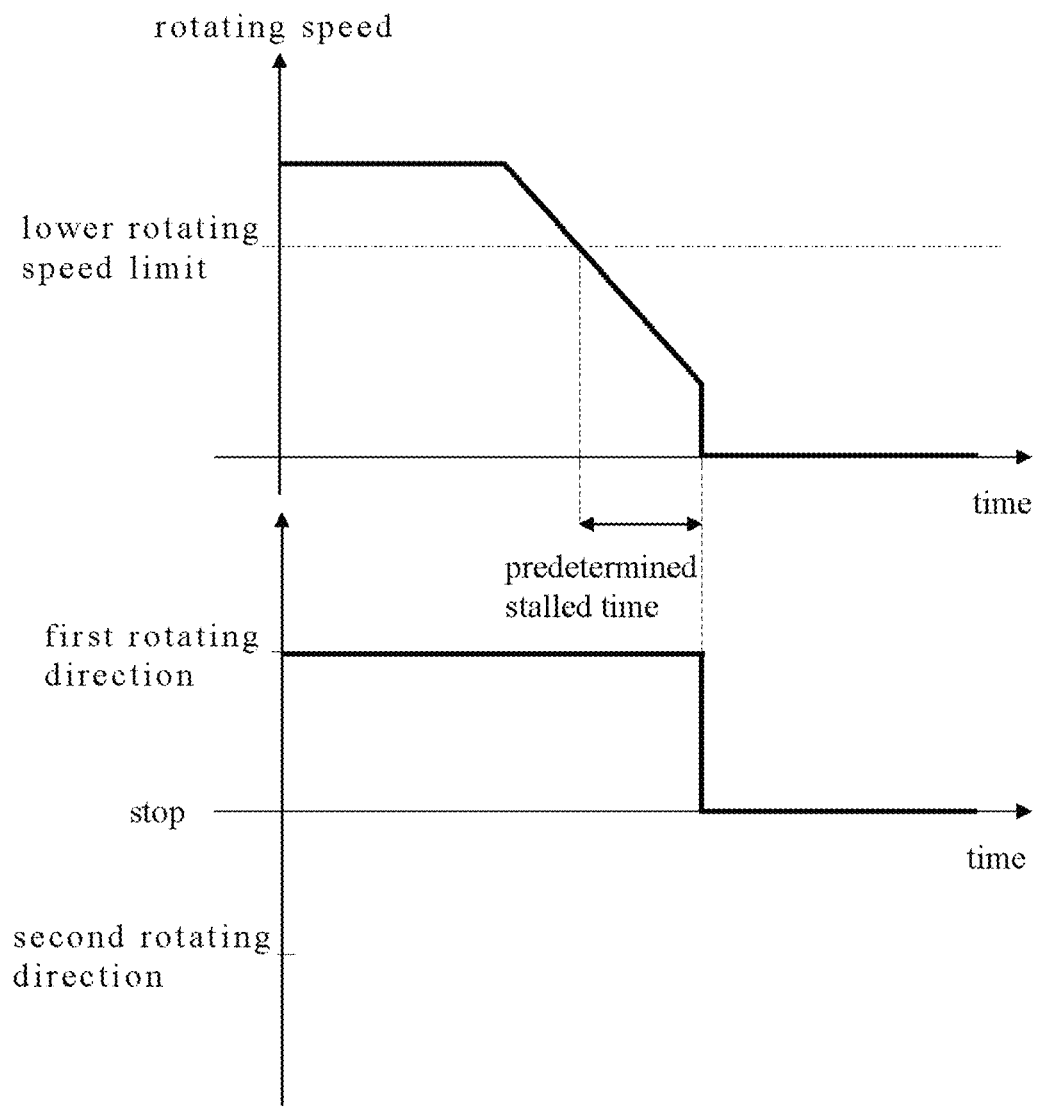
FIG. 21 is a time diagram showing an embodiment of detecting the pulling-while-retracting trigger event according to the control method in FIG. 14.

During the process of retracting the covering material 12, the rotating speed detecting member 32 may generate a pulling-while-retracting detecting result when detecting the covering material 12 is pulled by a pulling-while-retracting external force. The microcontroller 262 determines a pulling-while-retracting trigger event is received according to the pulling-while-retracting detecting result. The pulling-while-retracting trigger event is defined as detecting an external force (e.g., the pulling-while-retracting external force) applied against the upward movement of the lower end 12*a* of the covering material 12. An embodiment for detecting the pulling-while-retracting trigger event is shown in FIG. 21, which is similar to detecting the resistance when the covering material 12 is moved upward in the previous embodiment. The rotating speed of the rotating member 14 and a predetermined stalled time are used for determining if the covering material 12 is pulled by the external force. The external force may be exerted by the user to stop the lower end 12*a* of the covering material 12 from moving. The microcontroller 262 receives signals indicating the rotating speed of the rotating member 14 detected by the rotating speed detecting member 32 when the rotating member 14 rotates in the first rotating direction D1. If the rotating speed of the rotating member 14 decreases to be lower than the lower rotating speed limit for a predetermined stalled time, the processing unit 2622 determines that the fourth pulling-while-retracting trigger event is received, and stops the motor 20 and the rotating member 14 from rotating.

When the microcontroller 262 determines the pulling-while-retracting trigger event is received, the microcontroller 262 stops the lower end 12*a* of the covering material 12 from moving (Step 1406), and the control method 1400 goes back to Step 1401.

Step 1412: The microcontroller 262 determines that a lifting-while-retracting trigger event is received during the process of retracting the covering material 12.

During the process of retracting the covering material 12, the trigger detecting assemblies 36 may generate a lifting-while-retracting detecting result when detecting the lower end 12*a* of the covering material 12 is lifted by a lifting-while-retracting external force. The microcontroller 262 determines a lifting-while-retracting trigger event is received according to the lifting-while-retracting detecting result.

Step 1413: When the microcontroller 262 determines the lifting-while-retracting trigger event is received, the microcontroller 262 stops the lower end 12*a* of the covering material 12 from moving.

Step 1414: The microcontroller 262 determines that a lowering-while-still trigger event is received after the lower end 12*a* of the covering material 12 stops moving according to the lifting-while-retracting trigger event.

After the microcontroller 262 determines the lifting-while-retracting trigger event is received, the trigger detecting assemblies 36 generate a lowering-while-still detecting result when detecting the covering material 12 is lowered either naturally or by the pulling of a lowering-while-still external force. The microcontroller 262 determines the lowering-while-still trigger event is received according to the lowering-while-still detecting result.

Step 1415: When the microcontroller 262 determines that the lowering-while-still trigger event is received, the covering material 12 is configured to expand.

When the microcontroller 262 determines the lowering-while-still trigger event is received, the microcontroller 262 configures the motor 20 to expand the covering material 12 so that the lower end 12*a* of the covering material 12 moves in the direction toward the first predetermined position P1 for expanding the covering material 12.

Step 1416: When the lower end 12*a* of the covering material 12 lowers to reach the first predetermined position P1, the control method 1400 goes to Step 1406 to stop the lower end 12*a* of the covering material 12 from moving.

Figure 22:
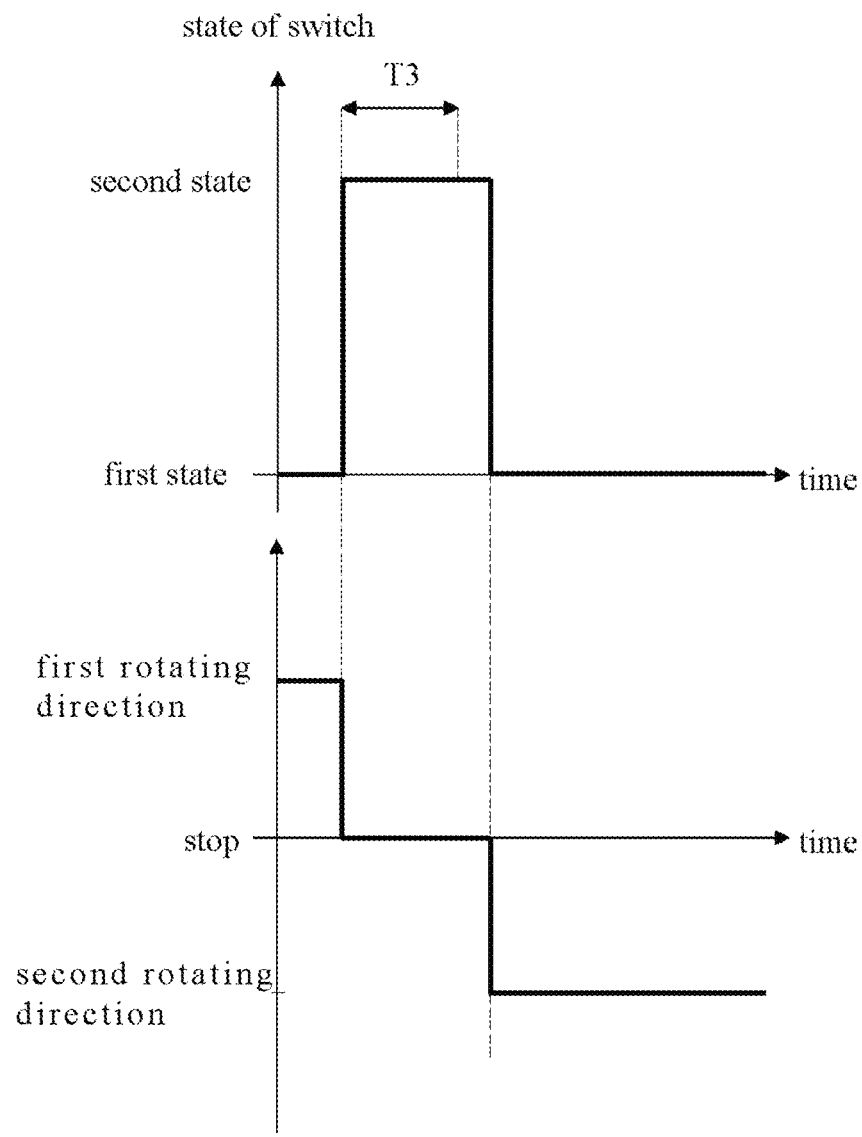
FIG. 22 is a time diagram showing an embodiment of detecting the lifting-while-retracting and the lower-while-still trigger events according to the control method in FIG. 14.

In this embodiment, the lifting-while-retracting trigger event is defined as detecting the lower end 12*a* of the covering material 12 is lifted by an external force (e.g., the lifting-while-retracting external force), and the lowering-while-still trigger event is defined as detecting the lower end 12*a* of the covering material 12 is lowered after it has been lifted by the lifting-while-retracting external force. An embodiment for detecting the lifting-while-retracting trigger event and the lowering-while-still trigger event is shown in FIG. 22. When the rotating member 14 rotates in the first rotating direction D1, the cords 44 are taut and the switches 40 are in the first state. If the user lifts the lower end 12*a* of the covering material 12, the cords 44 becomes loose from taut and the switches 40 turn into the second state. The processing unit 2622 determines that the lifting-while-retracting trigger event is received if the switches 40 remain in the second state for longer than a second predetermined lifting time T3. When the processing unit 2622 determines that the lifting-while-retracting trigger event is received, the microcontroller 262 configures the motor 20 to stop moving the covering material 12. After the user lowered the lower end 12*a* of the covering material 12, the cords 44 become taut from loose and the switches 40 return to the first state. The processing unit 2622 consequently determines the lowering-while-still trigger event is received. When the processing unit 2622 determines the lowering-while-still trigger event is received, the microcontroller 262 configures the motor 20 to drive the rotating member 14 to rotate in the second rotating direction D2. The lower end 12*a* of the covering material 12 moves in the direction toward the first predetermined position P1 for expanding the covering material 12. In this embodiment, the second predetermined lifting time T3 is configured to be 0.05 second. When the lower end 12*a* of the covering material 12 is moved downward to reach the first predetermined position P1, the microcontroller 262 configures the motor 20 to stop moving the lower end 12*a* of the covering material 12. In another embodiment, after the lower end 12*a* of the covering material 12 reaches the first predetermined position P1, the microcontroller 262 configures the motor 20 to drive the rotating member 14 to rotate in the first rotating direction D1 for moving the lower end 12*a* of the covering material 12 upward for the first distance L1. The cords 44 may therefore remain taut.

Step 1417: The microcontroller 262 determines that a lifting-during-expanding trigger event is received during the process of expanding the covering material 12.

During the process of expanding the covering material 12 according to the fifth and the lowering-while-still trigger events, the trigger detecting assemblies 36 generate a lifting-during-expanding detecting result when detecting the lower end 12a of the covering material 12 is moved by a lifting-during-expanding external force. The microcontroller 262 determines a lifting-during-expanding trigger event is received according to the lifting-during-expanding detecting result. In this embodiment, detecting the lifting-during-expanding trigger event is similar to detecting the lifting-while-expanding trigger event, which detects whether the lower end 12a of the covering material 12 is lifted by an external force (e.g., the lifting-during-expanding external force) and then lowered. An embodiment of the time diagram for detecting the lifting-during-expanding trigger event is shown in FIG. 18 and relevant description may be found above. In the embodiments, the user could maneuver the covering material 12 to expand, retract, or stop, and the covering material 12 would also stop moving when encounters an object.

When the microcontroller 262 determines the lifting-during-expanding trigger event is received, the control method 1400 goes to Step 1406 to stop the lower end 12a of the covering material 12 from moving.

In Step 1406, if the lower end 12a of the covering material 12 stops moving, the control method 1400 goes back to Step 1401 to detect the position of the lower end 12a of the covering material 12, and detects whether the high-position-lifting trigger event or the low-position-lifting trigger event is received.

In the above embodiments, the microcontroller 262 determines any one of the lifting-while-expanding trigger event to the lifting-during-expanding trigger event after some of the Steps 1401~1408 are executed. In other embodiments, one or more of the lifting-while-expanding trigger event to the lifting-during-expanding trigger event may also be detected and determined after the user utilizes a human-machine interface device to operate the electric window covering 100. For example, after the user utilizes a wireless controller to expand the covering material 12, the microcontroller may determine the lifting-while-expanding trigger event is received and configured the motor 20 to stop moving the lower end 12a of the covering material 12.

Figure 23:
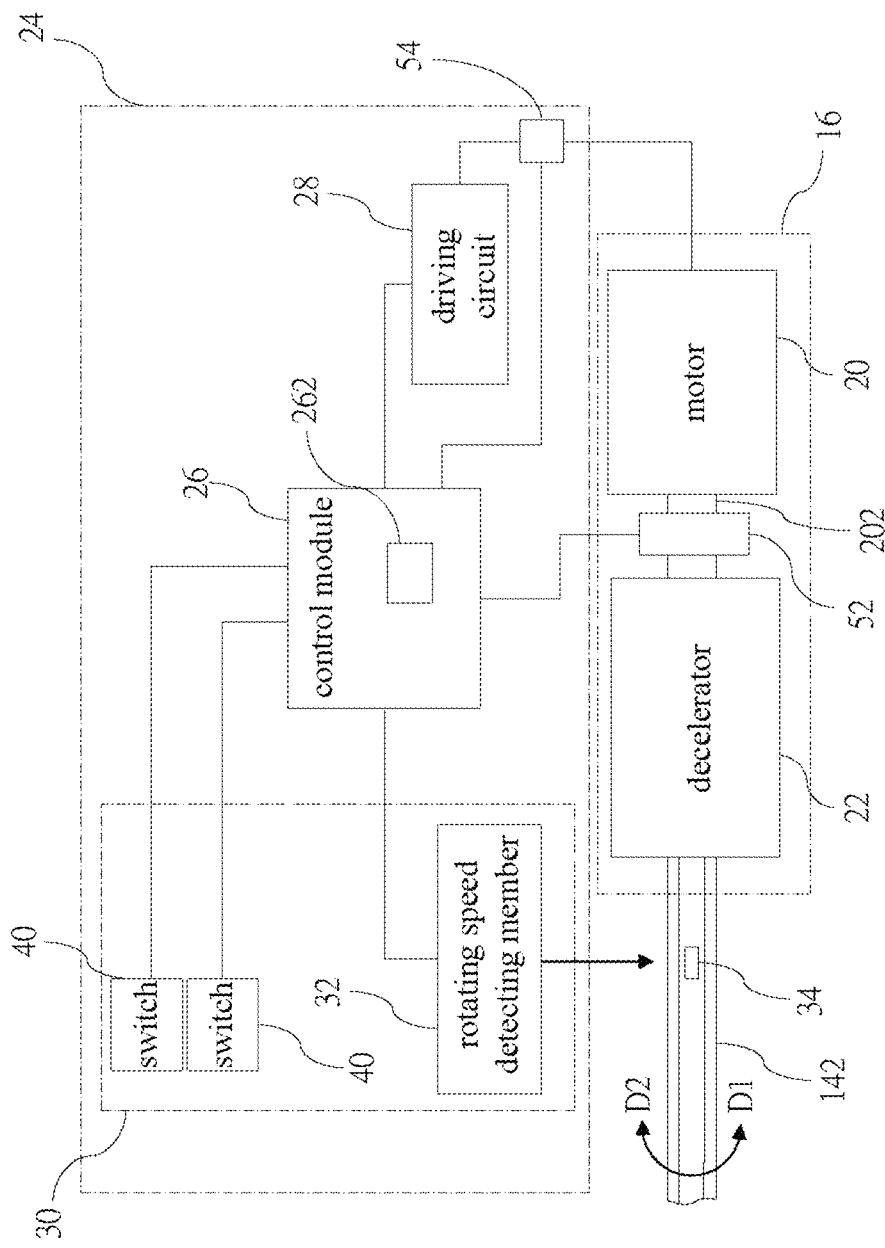
FIG. 23 is a schematic view showing another embodiment of the control device of the present disclosure.
Figure 24:
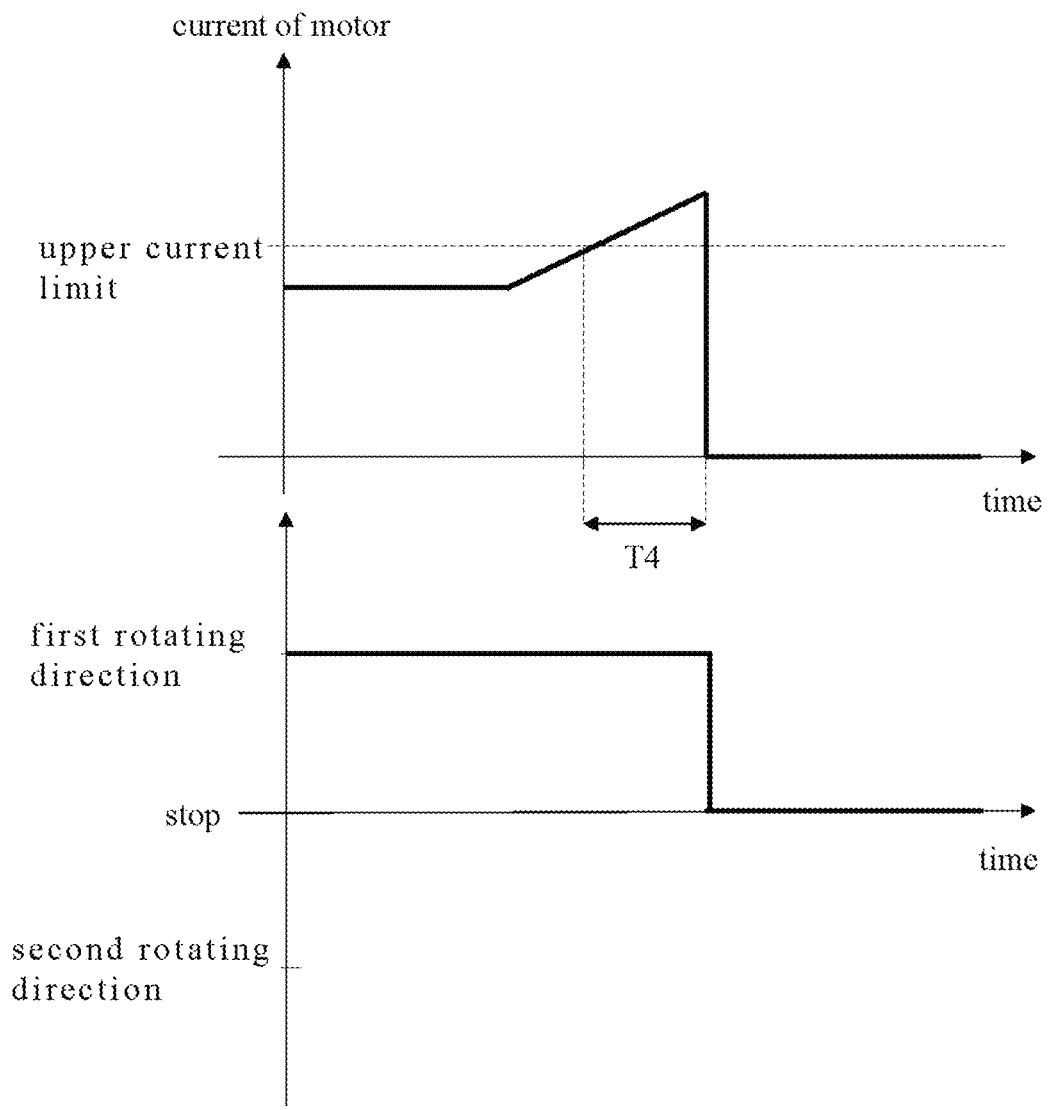
FIG. 24 is a time diagram showing another embodiment of detecting the pulling-while-retracting trigger event with the control device in FIG. 23.

Another embodiment of the control device of the electric window covering of the present disclosure is shown in FIG. 23. In this embodiment, the trigger detecting module 30 of the electric window covering further includes a current detector 54, provided between the motor 20 and the driving circuit 28, and electrically connected to the control module 26. The current detector 54 detects a current of the motor 20. In this embodiment, during the process of retracting the covering material 12 in Step 1408, the microcontroller 262 determines whether the pulling-while-retracting trigger event is received according to an increased current of the motor 20, which indicates there is an external force applied to the covering material 12. As shown in FIG. 24, while the rotating member 14 is rotating in the first rotating direction D1 to retract the covering material 12, the current of the motor 20 detected by the current detector 54 is normally smaller than an upper current limit. If the covering material 12 is pulled by an external force, the retraction of the cords 44, the rotation of the rotating member 14 and the operation of the motor 20 will be consequently hindered. The current of the motor 20 increases accordingly. The processing unit 2622 determines the pulling-while-retracting trigger event is received if the current detector 54 detects the current of the motor 20 is greater than the upper current limit for longer than a predetermined stalled time T4. When the processing unit 2622 determines the pulling-while-retracting trigger event is received, the microcontroller 262 configures the motor 20 to stop driving the rotating member 14 to stop moving the lower end 12a of the covering material 12 upward. The control method 1400 then goes back to Step 1401. In this embodiment, the predetermined stalled time T4 can be configured between 0.2-1 second.

In this embodiment, the current of the motor 20, the upper current limit and the predetermined stalled time T4 are used for determining whether an external force is applied when the covering material 12 is moved upward. Similar mechanism may also be applied to the first embodiment for determining whether the covering material 12 encounters resistance while it is moved upward.

Figure 25:
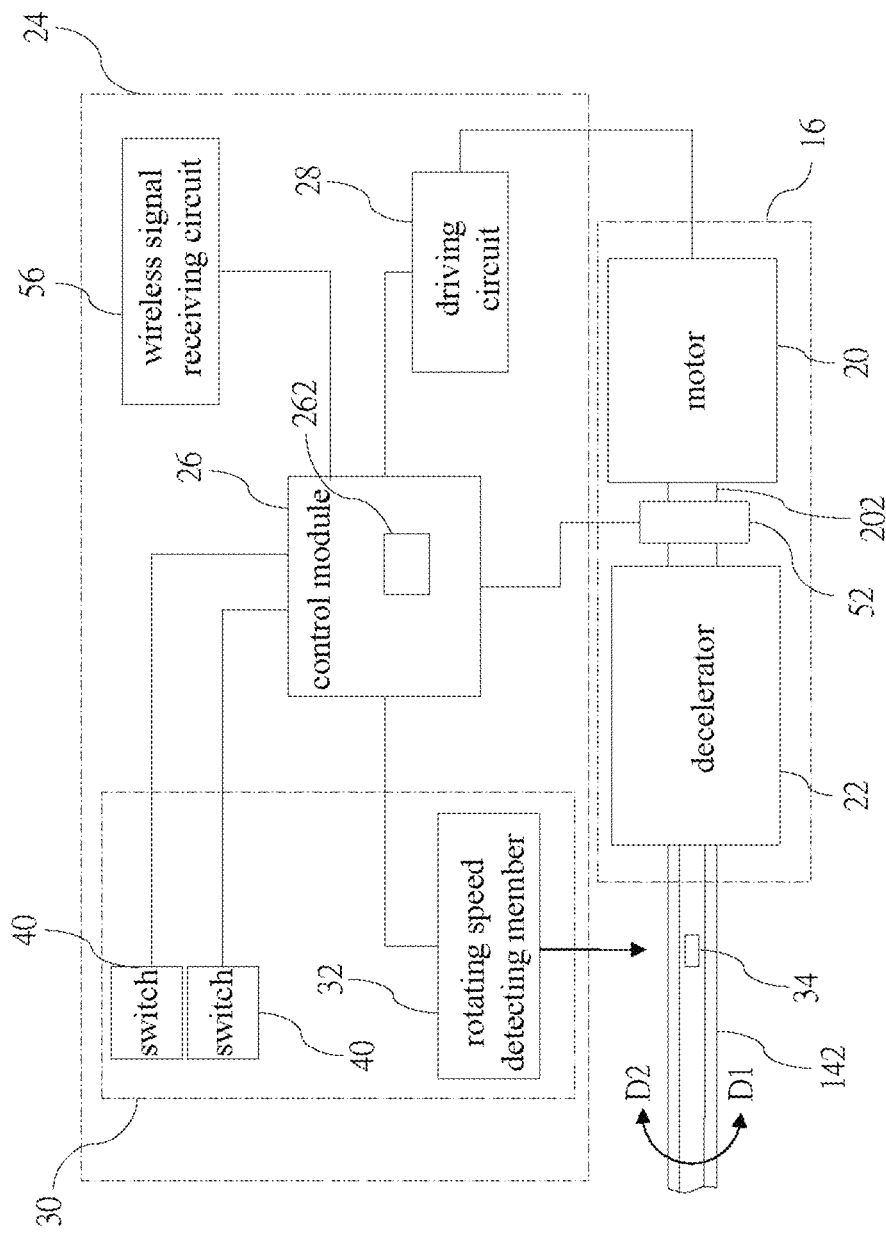
FIG. 25 is a schematic view showing another embodiment of the control device of the present disclosure.
Figure 26:
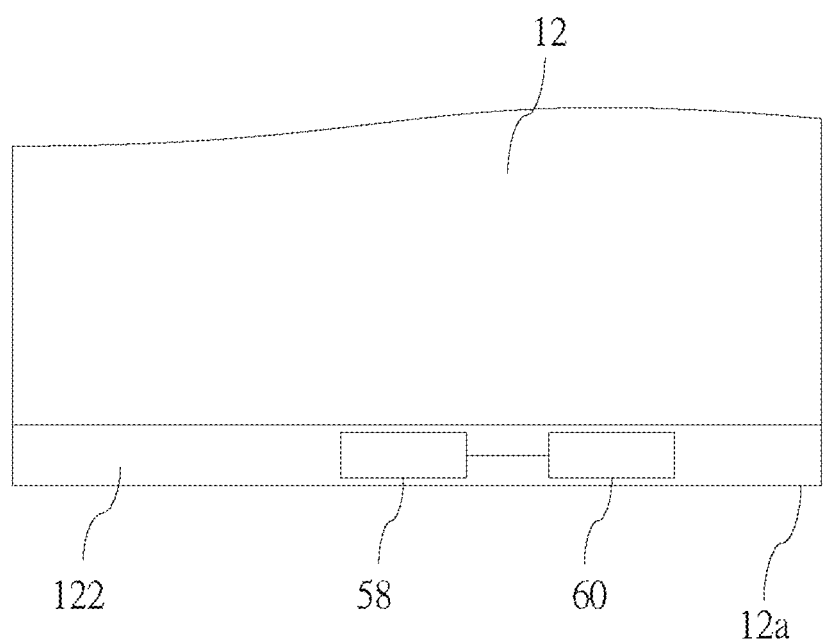
FIG. 26 is a schematic view showing an embodiment of the trigger detecting module of the present disclosure.

Another embodiment of the control device of the electric window covering of the present disclosure is shown in FIGS. 25-26. In this embodiment, the control device 24 includes a wireless signal receiving circuit 56 electrically connected to the microcontroller 262 of the control module 26. The trigger detecting module 30 further includes an accelerometer 58 and a wireless signal transmission circuit 60 which are electrically connected to each other and provided in the bottom rail 122 at the lower end 12a of the covering material 12. The accelerometer 58 detects an acceleration of the lower end 12a of the covering material 12, and transmits an acceleration data through the wireless signal transmission circuit 60. The microcontroller 262 of the control module 26 receives the acceleration data through the wireless signal receiving circuit 56 and the processing unit 2622 of the microcontroller 262 determines whether the lower end 12a of the covering material 12 is moved (e.g., lifted or lowered) according the acceleration data.

In this embodiment, the detections of the high-position-lifting, the low-position-lifting, the lifting-while-expanding, the lifting-while-retracting, the sixth lowering-while-still, and the lifting-during-expanding trigger events may also be modified accordingly.

Figure 27:
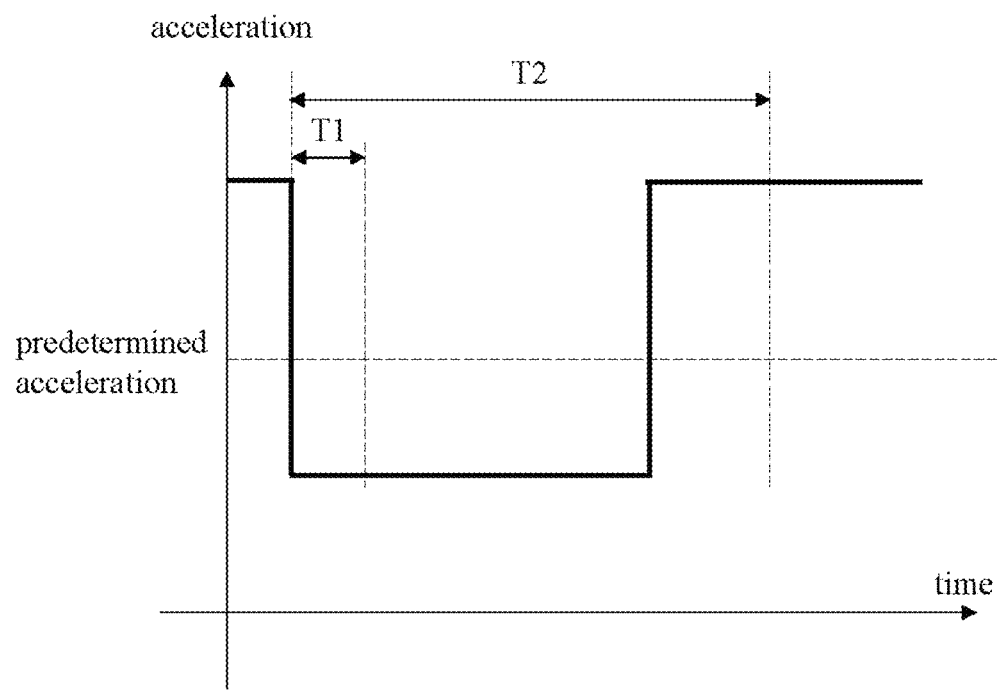
FIG. 27 is a time diagram showing another embodiment of detecting the high-position-lifting trigger event with the trigger detecting module in FIG. 26.

FIG. 27 illustrates a time diagram of detecting the high-position-lifting trigger event with the embodiment in FIGS. 25-26. When the lower end 12a of the covering material 12 is lifted, the value of the acceleration data detected by the accelerometer 58 decreases. When the lower end 12a of the covering material 12 is lowered, the value of the acceleration data detected by the accelerometer 58 increases. When the acceleration data received by the microcontroller 262 decreases to be less than a predetermined acceleration threshold for longer than the first predetermined lifting time T1 and then increases to be higher than the predetermined acceleration threshold within the predetermined lowering time T2, the processing unit 2622 determines the high-position-lifting trigger event is received. Similar mechanism may also be utilized for detecting the low-position-lifting trigger event, the lifting-while-expanding trigger event and the lifting-during-expanding trigger event.

Figure 28:
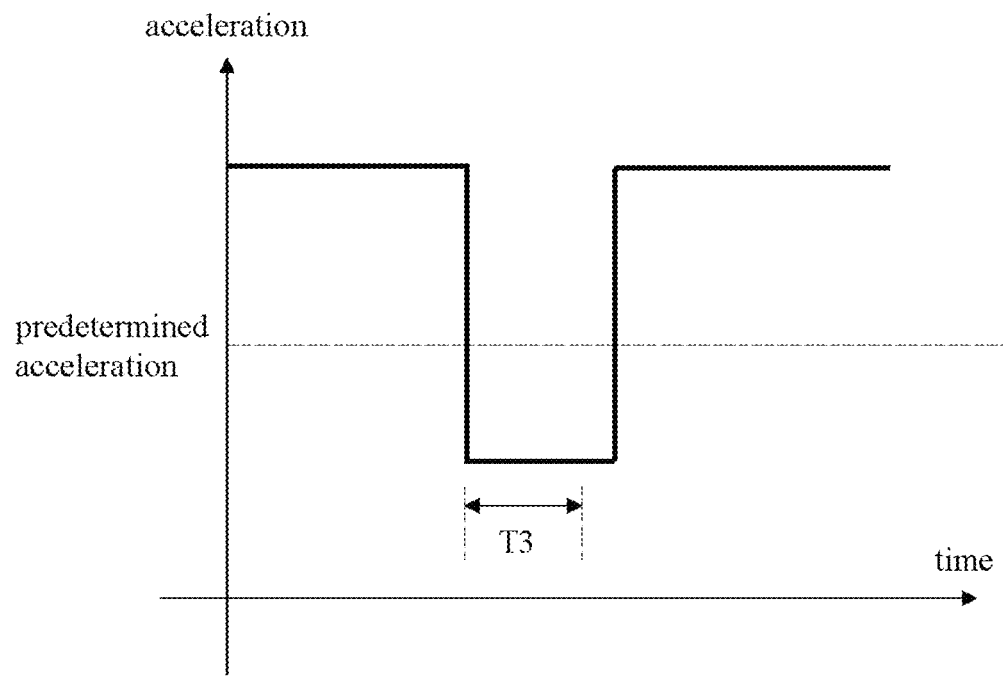
FIG. 28 is a time diagram showing another embodiment of detecting the lifting-while-retracting and lower-while-still trigger events with the trigger detecting module in FIG. 26.

FIG. 28 illustrates a time diagram for detecting the fifth lifting-while-retracting and the lowering-while-still trigger events. When the lower end 12a of the covering material 12 is lifted, the acceleration data detected by the accelerometer 58 decreases. When the acceleration data received by the microcontroller 262 decreases to be less than the predetermined acceleration threshold for longer than the second predetermined lifting time T3 during the process of retracting the covering material 12, the processing unit 2622 determines the lifting-while-retracting trigger event is received. If the lifting-while-retracting trigger event is received, the microcontroller 262 stops the motor 20 from retracting the lower end 12a of the covering material 12. After receiving the lifting-while-retracting trigger event, if the received acceleration data increases to be higher than the predetermined acceleration threshold (i.e., the lower end 12a of the covering material 12 is lowered), the processing unit 2622 determines the lowering-while-still trigger event is received. If the microcontroller 262 determines the lowering-while-still trigger event is received, the microcontroller 262 configures the motor 20 to move the lower end 12a of the covering material 12 downward for expanding the covering material.

Figure 29:
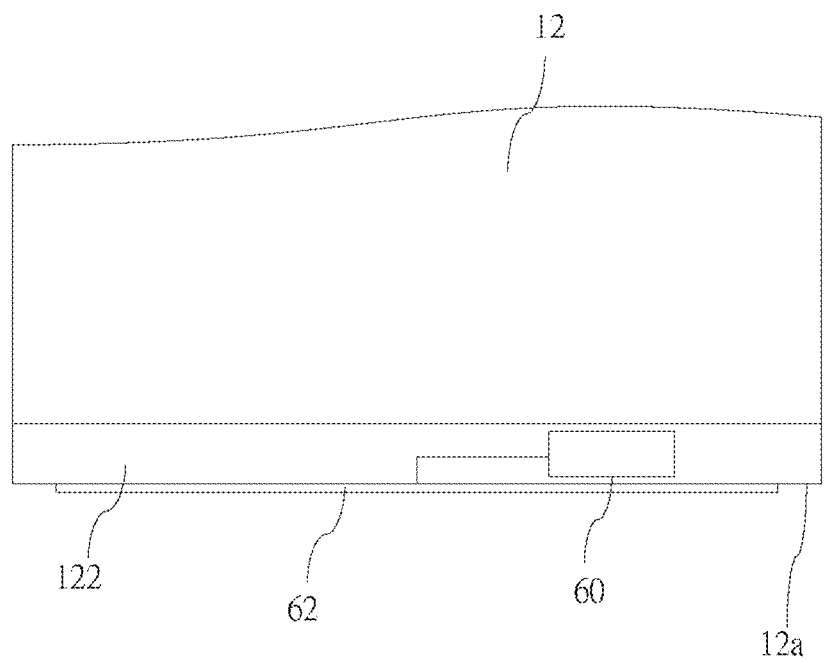
FIG. 29 is a schematic view showing another embodiment of the trigger detecting module of the present disclosure.

FIG. 29 shows another embodiment of the trigger detecting module 30, which includes a piezoelectric component 62 and a wireless signal transmission circuit 60 electrically connected to each other. The piezoelectric component 62 is provided at a bottom of the bottom rail 122, and the wireless signal transmission circuit 60 is provided in the bottom rail 122. If the bottom rail 122 is lifted by a user, the piezoelectric component 62 detects an upward force and change the output voltage of the piezoelectric component 62. The output voltage of the piezoelectric component 62 is transmitted through the wireless signal transmission circuit 60. After the microcontroller 262 receives the output voltage of the piezoelectric component 62 through the wireless signal receiving circuit 56, the processing unit 2622 of the microcontroller 262 determines if the lower end 12a of the covering material 12 is moved by an external force (e.g., lifted or lowered) according to the output voltage of the piezoelectric component 62. In this embodiment, the output voltage of the piezoelectric component 62 is configured to be proportional to the pressure exerted on the piezoelectric component 62.

In this embodiment, the detections of the high-position-lifting, the low-position-lifting, the lifting-while-expanding, the lifting-while-retracting, the lowering-while-still, and the lifting-during-expanding trigger events are modified accordingly.

Figure 30:
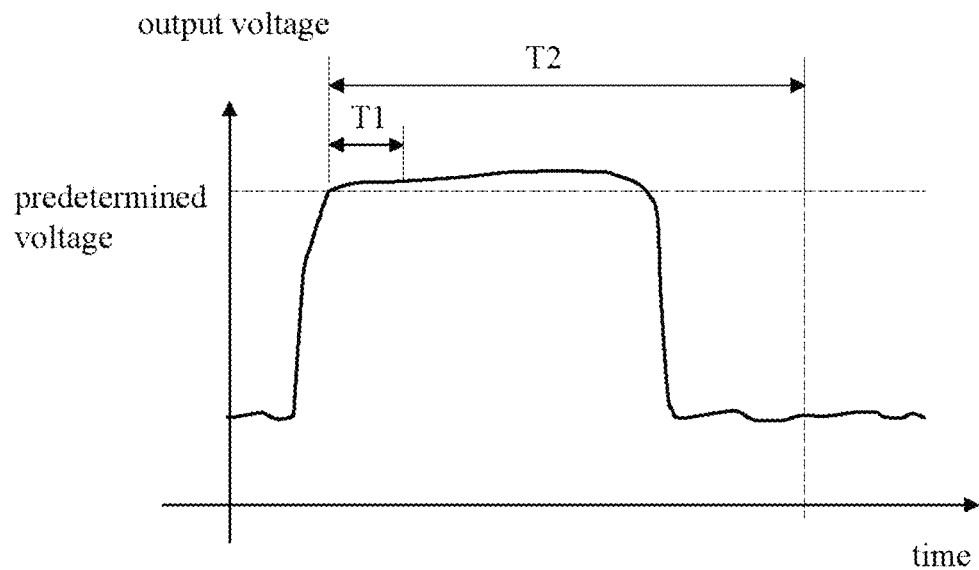
FIG. 30 is a time diagram showing another embodiment of detecting the high-position-lifting trigger event with the trigger detecting module in FIG. 29.

FIG. 30 illustrates a time diagram for detecting the high-position-lifting trigger event. When the lower end 12a of the covering material 12 is lifted, the output voltage generated by the piezoelectric component 62 increases. When the lower end 12a of the covering material 12 is lowered, the output voltage generated by the piezoelectric component 62 decreases. When the output voltage of the piezoelectric component 62 received by the microcontroller 262 increases to be higher than or equal to a predetermined voltage threshold for longer than the first predetermined lifting time T1 and then decreases to be less than the determined voltage threshold within the predetermined lowering time T2, the processing unit 2622 determines the high-position-lifting trigger event is received. Similar mechanism may also be utilized for detecting the low-position-lifting trigger event, the lifting-while-expanding trigger event and the lifting-during-expanding trigger event.

Figure 31:
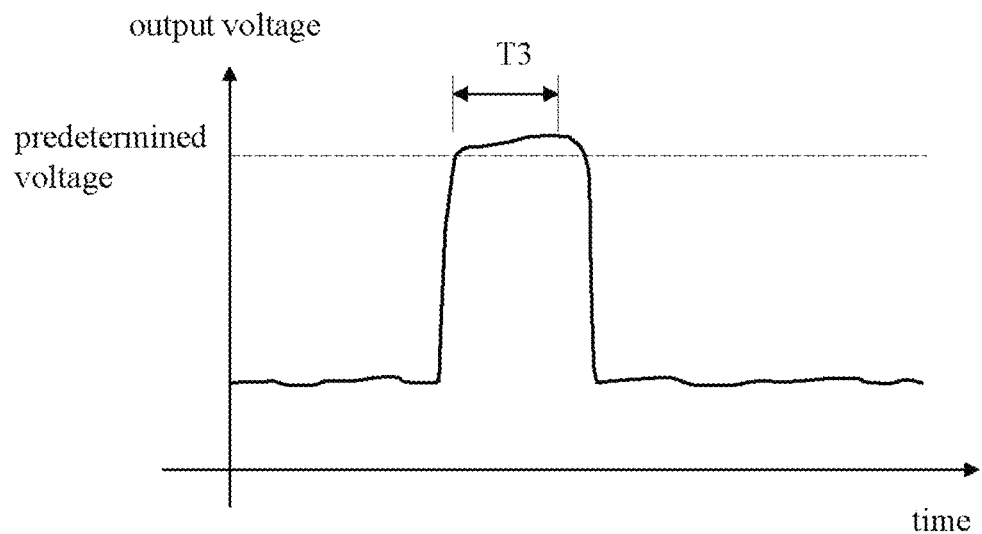
FIG. 31 is a time diagram showing another embodiment of detecting the lifting-while-retracting and lower-while-still trigger events with the trigger detecting module in FIG. 29.

FIG. 31 illustrates a time diagram for detecting the lifting-while-retracting and the lowering-while-still trigger events. When the lower end 12a of the covering material 12 is lifted, the output voltage generated by the piezoelectric component 62 increases to be greater than or equal to the predetermined voltage threshold. When the output voltage of the piezoelectric component 62 received by the microcontroller 262 is greater than or equal to the predetermined voltage threshold for longer than the second predetermined lifting time T3 during the process of retracting the covering material 12, the processing unit 2622 determines the lifting-while-retracting trigger event is received. If the lifting-while-retracting trigger event is received, the microcontroller 262 stops the motor 20 from retracting the lower end 12a of the covering material 12. After receiving the lifting-while-retracting trigger event, if the output voltage of the piezoelectric component 62 received by the microcontroller 262 decreases to be less than the predetermined voltage threshold (i.e., the lower end 12a of the covering material 12 is lowered), the processing unit 2622 determines the lowering-while-still trigger event is received. If the lowering-while-still trigger event is received, the microcontroller 262 configures the motor 20 to move the lower end 12a of the covering material 12 downward for expanding the covering material 12.

In another embodiment, the output voltage of the piezoelectric component 62 may also be configured to be inversely proportional to the pressure exerted on the piezoelectric component 62. When the lower end 12a of the covering material 12 is lifted, the output voltage generated by the piezoelectric component 62 decreases. Afterward, when the lower end 12a of the covering material 12 is lowered, the output voltage generated by the piezoelectric component 62 increases. The detections and the determinations of the trigger events may also be adjusted accordingly.

In addition to the aforementioned switches 40, accelerometer 58, and piezoelectric component 62, other means can also be utilized as detecting module to detect the lower end 12a of the covering material 12, such as an electrostatic sensor, a capacitive sensor, a gyroscope, a vibration sensor, a sound sensor, and an ultrasonic wave sensor. When the lower end 12a of the covering material 12 is lifted or lowered, the microcontroller 262 of the control module 26 determines whether one or more trigger events are received according to the output signals of the detecting means.

Therefore, the above control method enables the user to expand, retract, or stop the covering material by [via] manipulating the covering material without the human-machine interface device (e.g., wired or wireless controllers), which would be more convenient in use.

In another embodiment, when the lower end 12a of the covering material 12 of the electric window covering encounters an external object, the microcontroller 262 of the present disclosure may cope with this situation with some modifications. When the detecting module (e.g., one or more of the trigger detecting module 30, position detecting module 52, switches 40, accelerometer 58, and piezoelectric component 62) detects the lower end 12a of the covering material 12 moves in the first moving direction and encounters resistance, the microcontroller 262 may configure the motor 20 to rotate reversely instead of stopping the driving device 16. The lower end 12a of the covering material 12 is moved in the second moving direction, which is different from the first moving direction. For example, if the driving device 16 originally rotates in the second rotating direction D2 and the microcontroller 262 configures the driving device 16 to rotate reversely, the microcontroller 262 configures the driving device 16 to stop and then rotate in the first rotating direction D1. In the process of configuring the driving device 16 to rotate reversely, the microcontroller 262 may explicitly configure the driving device 16 to rotate in a first rotating direction, stop for a human noticeable duration, and then rotate in a second rotating direction. In another embodiment, the microcontroller 262 may also configure the driving device 16 to operate as if the driving device 16 changes the rotating direction without a halt. There is, however, at least a small amount of time, even if human-unnoticeable, in which the rotating speed of the driving device 16 approaches zero and behaves like being stopped. Whether the duration of time that the driving device 16 remains stopped is noticeable by human or not, when referring to the process of rotating the driving device 16 reversely, the driving device 16 is considered to stop from rotating in a previous rotating direction and then rotate in the other direction. Accordingly, the lower end 12a of the covering material 12 is considered to stop from a previous moving direction and then move in the other direction. In the following embodiments, the first moving direction of the lower end 12a of the covering material 12 is downward, and the second moving direction is upward. However, the orders of the moving directions are not limitations of the present disclosure.

Figure 32:
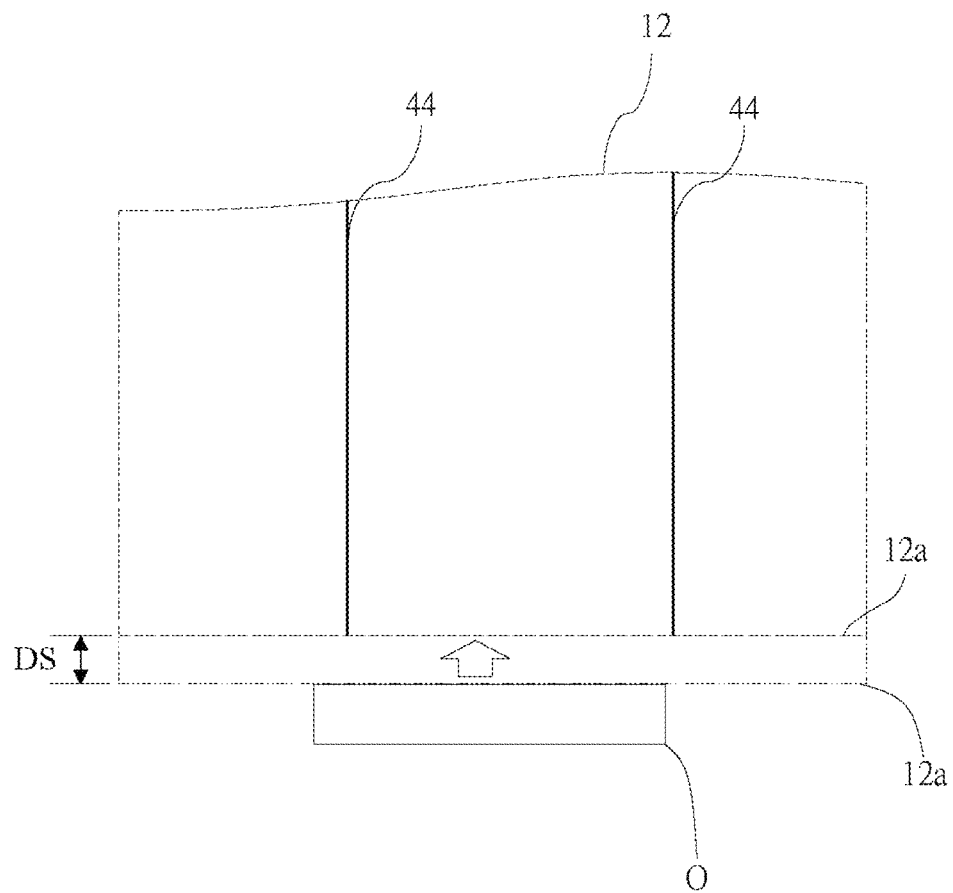
FIG. 32 is a schematic view showing an embodiment of the lower end of the covering material moving upward for a pullback distance after interfering with an external object.

When the lower end 12a of the covering material 12 moves downward and encounters resistance, the cords 44 may become loose and tangled, and therefore fail to function properly anymore. In another embodiment, as shown in FIG. 32, when the detecting module detects the lower end 12a of the covering material 12 moves downward and encounters resistance from an external object O, the microcontroller 262 configures the driving device 16 to rotate reversely. Thus, a suitable length of the cords 44 may be reeled in to the spools 144, and the cords 44 may remain taut. The tangle of the cords 44 and the consequent malfunction can be prevented. The reeled-in length of the cords 44 may be configured to be a predetermined length, a length determined by rotating the driving device 16 for a predetermined return time, or dynamically determined by the microcontroller 262 to decide if the reeled-in length is sufficient to make the cords 44 become taut again, whereby to move the lower end 12a of the covering material 12 upward for a return distance DS. For example, in the process of rotating the driving device 16 reversely, once the state of the switches 40 change to indicate that the cords 44 are taut, the microcontroller 262 accordingly configures the driving device 16 to stop rotating reversely.

Moreover, the microcontroller 262 may also calculate the position of the lower end 12a of the covering material 12 according to the output signal(s) of the components such as the rotating speed detecting member 32, the encoder 52, and/or the resolver. The output signals of the encoder 52 and the resolver (not shown) can be configured to represent the rotating direction, the rotating speed, the rotating time, and/or the rotating distance of the rotating member 14 and/or the driving device 16. In addition, the rotating speed detecting member 32 can be also configured to detect the rotating direction and the rotating speed of the rotating member 14 and/or the driving device 16 according to information such as the rotating speed(s) of the spindle 142, the spool 144 and/or the output shaft 202 of the motor 20. The microcontroller 262 would be able to calculate the length of the cords 44 released from the headrail 10 based on the rotating direction, the rotating speed, and the rotating time of the rotating member 14 and/or the driving device 16 according to the output signal(s) of the rotating speed detecting member 32 and/or other component(s) (e.g., an encoder, a resolver, and/or a memory unit 2624). In addition to the released length of the cords 44, the microcontroller 262 also has the knowledge of the second predetermined position P2 and/or the first predetermined position P1 of the covering material 12, and therefore can calculate the position of the lower end 12a of the covering material 12.

In another embodiment, when the lower end 12a of the covering material 12 encounters resistance from an external object O, according to the position of the lower end 12a of the covering material 12, different problems may happen and require different solutions. The microcontroller 262 may further configure the driving device 16 to rotate reversely for moving the lower end 12a of the covering material 12 for different distances in response to various scenarios. For example, the first predetermined position P1 of the lower end 12a of the covering material 12 may be configured to be a position where the lower end 12a of the covering material 12 touches or approaches a reference surface R. The reference surface R may be configured to be a sill, a floor, a ground, or other suitable horizontal levels (which may be a tilt and/or uneven surface). In this embodiment, if the window covering is not properly installed, the cords 44 or the spool 144 ages, and/or there are items (e.g., shoes, books and toys) situated near the first predetermined position P1, the lower end 12a of the covering material 12 would not be able to move to the first predetermined position P1 when encounters resistance in the vicinity of the reference surface R. In such circumstances, the cords 44 cannot become loose to a larger extent. In this situation, the possibility of the cords 44 getting tangled is lower, and reeling in a smaller length of the cords 44 for moving the lower end 12a of the covering material 12 in the reverse direction for a smaller distance may suffice. Whereas, when the lower end 12a of the covering material 12 encounters an external object O at a distance away from the reference surface R, there is more room for the cords 44 to loosen and the probability of tangling the cords 44 is higher. It may be better to reel in a greater length of the cords 44 for moving the lower end 12a of the covering material 12 for a greater distance to prevent the tangle of the cords 44. In the above embodiment, the reference surface R is configured to be a physical position in the real world. In other embodiments, the position of the reference surface R may be configured according to the upper limit (the second predetermined position P2) of the covering material 12, the lower limit (the first predetermined position P1) of the covering material 12, the position of the headrail 10, and/or the output of the rotating speed detecting member 32. The microcontroller 262 may therefore configure the driving device 16 to rotate, stop and rotate reversely according to the position of the reference surface R. For example, the control module 26 may configure the reference surface R to be the position where the lower end 12a of the covering material 12 reaches after the driving device 16 rotating for a predetermined time (for example, 15 seconds) for releasing the lower end 12a of the covering material 12 from the position of the headrail 10. In another embodiment, the control device 24 may be configured to have multiple reference surfaces.

Moreover, since the covering material 12 may be elastic or stretchable to some degree, it might not be easy to precisely detect the distance when the microcontroller 262 configures the lower end 12a of the covering material 12 to move. Therefore, in another embodiment, when the microcontroller 262 configures the lower end 12a of the covering material 12 to move, the return distance DS of the covering material 12 may be configured according to the length of the cords 44 to be reeled in by the driving device 16.

Figure 33:
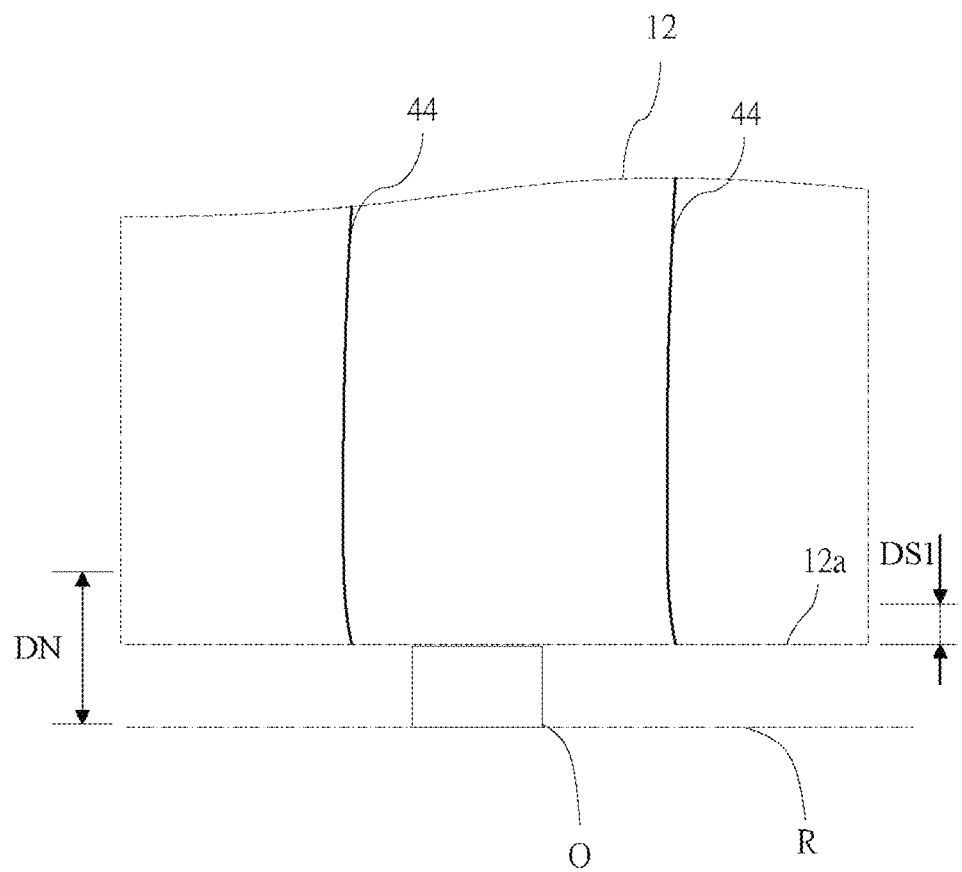
FIG. 33 is a schematic view showing an embodiment of the lower end of the covering material interfering with an external object at a location within a predetermined proximity distance measured from a reference surface.
Figure 34:
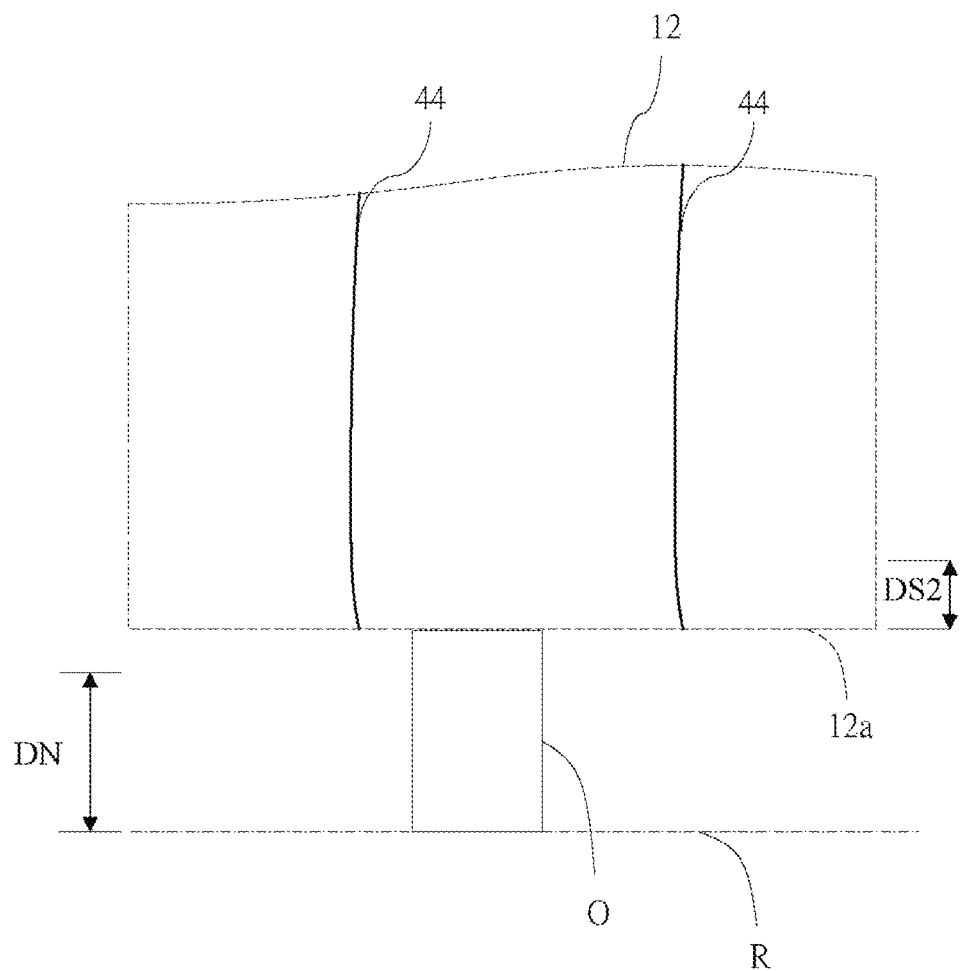
FIG. 34 is a schematic view showing an embodiment of the lower end of the covering material interfering with an external object at a location out of the predetermined proximity distance measured from a reference surface.

In another embodiment, as shown in FIG. 33, when the lower end 12a of the covering material 12 encounters an external object O within a predetermined proximity distance DN measured from the reference surface R, the microcontroller 262 correspondingly configures the driving device 16 to reel in the cords 44 for a first length for moving the lower end 12a of the covering material 12 upward for a first return distance DS1, whereby to prevent the cords 44 from tangling. On the other hand, as shown in FIG. 34, when the lower end 12a of the covering material 12 encounters an external object O at a position out of the predetermined proximity distance DN measured from the reference surface R, the microcontroller 262 configures the driving device 16 to reel in the cords 44 for a second length for moving the lower end 12a of the covering material 12 upward for a second return distance DS2, whereby to prevent the cords 44 from tangling. In this embodiment, the first length is configured to be smaller than the second length, so that the first return distance DS1 is smaller than the second return distance DS2. Moreover, the first length may also be configured to be greater than or equal to the second length for meeting different design requirements, so that the first return distance DS1 is greater than or equal to the second return distance DS2. In another embodiment, the first length is configured to be greater than the second length for solving another problem. When the lower end 12a of the covering material 12 encounters the external object O at a position out of the predetermined proximity distance measured from the reference surface R, the microcontroller 262 correspondingly configures the driving device 16 to reel in the cords 44 for the second length for moving the lower end 12a of the covering material 12 upward for a shorter second return distance DS2. In this embodiment, the reference surface R and/or the predetermined proximity distance DN may be respectively configured to be different from the counterparts in the previous embodiment. The shorter second return distance DS2 may prevent the lower end 12a of the covering material 12 from bumping into the headrail 10, whereby to avoid unnecessary reactions and/or damages of the components of the electric window covering. For example, the power consumption may be lowered for not executing unnecessary operations which may take place when the lower end 12a of the covering material 12 and the headrail 10 squeeze the covering material 12. Moreover, the microcontroller 262 may configure the driving device 16 to reel in the cords 44 for moving the lower end 12a of the covering material 12 upward for a same return distance DS wherever it encounters the external object O. In another embodiment, the microcontroller 262 may also configure the driving device 16 to reel in the cords 44 for moving the lower end 12a of the covering material 12 for a return distance DS which is to be determined depending on the predetermined proximity distance DN between the reference surface R and the position where the lower end 12a of the covering material 12 encounters the external object O. For example, if the lower end 12a of the covering material 12 encounters an external object O in the vicinity of the reference surface R and the headrail 10, the microcontroller 262 configures the driving device 16 to reel in the cords 44 for moving the lower end 12a of the covering material 12 upward for a shorter return distance DS. On the contrary, if the lower end 12a of the covering material 12 encounters the external object O out of the vicinity of the reference surface R, the microcontroller 262 configures the driving device 16 to reel in the cords 44 for moving the lower end 12a of the covering material 12 upward for one or more greater return distances DS.

Moreover, if the microcontroller 262 configures the driving device 16 to move the lower end 12a of the covering material 12 upward too much, a gap may be left or widened in the vicinity of the reference surface R, allowing light to pass through and bothering the user. In another embodiment, when the lower end 12a of the covering material 12 encounters an external object O in the vicinity of the reference surface R, the microcontroller 262 configures the driving device 16 to move the lower end 12a of the covering material 12 upward for a short return distance DS and determine whether the switches 40 have been changed to a first state indicating that the cords 44 are taut. By iterating the operations of moving the lower end 12a of the covering material 12 upward for a short return distance DS and determining whether the cords 44 are taut, the microcontroller 262 could stop the reverse rotation of the driving device 16 shortly after the switches 40 change to the first state indicating that the cords 44 are taut or after a predetermined number of iterations are executed. Therefore, the gap formed between the lower end 12a of the covering material 12 and the reference surface R may be eliminated or narrowed.

Moreover, if the lower end 12a of the covering material 12 moves at a high speed when encounters an external object O, the rotating speed of the rotating member is high and a large amount of the cords 44 may become loose. The possibility that the cords 44 get tangled and malfunctioned may therefore be higher. In another embodiment, the microcontroller 262 configures the driving device 16 to move the lower end 12a of the covering material 12 for different return distances DS according to different rotating speed of the driving device 16 and/or the rotating member 14 (for example, the return distances DS can be determined according to a predetermined rotating speed, a custom defined rotating speed, and/or output signals from components such as the rotating speed detecting member 32, the encoder 52, and/or the resolver). When the rotating speed of the driving device 16 and/or the rotating member 14 is lower than a predetermined speed threshold so that the lower end 12a of the covering material 12 moves downward with a first speed until bumping into the external object O, the microcontroller 262 configures the driving device 16 to reel in the cords 44 for a third length for moving the lower end 12a of the covering material 12 upward for a third return distance to prevent the cords 44 from tangling. When the rotating speed of the driving device 16 and/or the rotating member 14 is higher than the predetermined speed threshold so that the lower end 12a of the covering material 12 moves downward with a second speed until bumping into the external object O, the microcontroller 262 configures the driving device 16 to reel in the cords 44 for a fourth length for moving the lower end 12a of the covering material 12 upward for a fourth return distance to prevent cords 44 from tangling, wherein the first speed is lower than the second speed. In this embodiment, the third length is configured to be smaller than the fourth length, so that the third return distance is smaller than the fourth return distance. In another embodiment, the third length may also be configured to be greater than or equal to the fourth length for meeting different design requirements, and the third return distance is greater than or equal to the fourth return distance. Moreover, in other embodiments, when the lower end 12a of the covering material 12 bumps into an external object O during its downward movement, the microcontroller 262 can also configure the lower end 12a of the covering material 12 to move upward for the same return distance DS no matter which speed the lower end 12a of the covering material 12 moves at. In another embodiment, the microcontroller 262 may also configure the driving device 16 to reel in the cords 44 for moving the lower end 12a of the covering material 12 upward for a return distance DS which is to be determined according to the rotating speed of the driving device 16 and/or the rotating member 14. In addition, there can be multiple different predetermined speed thresholds configured in advance, which correspond to different upward return distances, respectively.

Moreover, the above embodiments may be properly combined to accommodate different scenarios, whereby to use various operation modes to move the lower end 12a of the covering material 12. For example, when the lower end 12a of the covering material 12 encounters an external object O, the microcontroller 262 can, based on different criteria, configure the driving device 16 with a first operation mode to move the lower end 12a of the covering material 12 in another direction, or configure the driving device 16 with a second operation mode to stop the driving device 16 so that the lower end 12a of the covering material 12 stops moving. In another embodiment, when the lower end 12a of the covering material 12 moves downward and encounters an external object O at a position out of a predetermined proximity distance DN measured from the reference surface R, the microcontroller 262 configures the driving device 16 to operate in the first operation mode which moves the lower end 12a of the covering material 12 upward for a proper return distance DS. When the lower end 12a of the covering material 12 encounters an external object O at a position within the predetermined proximity distance DN measured from the reference surface R, the microcontroller 262 configures the driving device 16 to operate in the second operation mode which stops the driving device 16 without making it rotate reversely, so that the lower end 12a of the covering material 12 stops moving. In another embodiment, when the lower end 12a of the covering material 12 encounters an external object O within the predetermined proximity distance DS measured from the reference surface R, the microcontroller 262 configures the driving device 16 to operate in the first operation mode, whereby to move the lower end 12a of the covering material 12 upward for an appropriate return distance DS. When the lower end 12a of the covering material 12 moved downward and bumps into an external object O at a position out of the predetermined proximity distance DN measured from the reference surface R, the microcontroller 262 configures the driving device 16 to operate in the second operation mode, whereby to stop the driving device 16 without making it rotate reversely. In addition, the microcontroller 262 can also operate in the first operation mode to configure the driving device 16 to move the lower end 12a of the covering material 12 in a reverse direction for different distances based on different conditions. In another embodiment, when the lower end 12a of the covering material moves downward and encounters an external object O at a position within the predetermined proximity distance DN measured from the reference surface R, the microcontroller 262 configures the driving device 16 to reel in the cords 44 for a fifth length for moving the lower end 12a of the covering material 12 upward for a shorter fifth return distance. When the lower end 12a of the covering material 12 encounters an external object O at a position out of the predetermined proximity distance DN measured from the reference surface R, the microcontroller 262 configures the driving device 16 to reel in the cords 44 for different lengths according to the different moving speeds of the lower end 12a of the covering material 12. For example, when the lower end 12a of the covering material 12 is moved at a first speed, the cords 44 will be reeled in for a sixth length. When the lower end 12a of the covering material 12 is moved at a second speed, the cords 44 will be reeled in for a seventh length L7, wherein the sixth length is different from the seventh length. The sixth length can be configured to be smaller than the seventh length, so that the lower end 12a of the covering material 12 can be moved upward for different distances, i.e., the sixth return distance and the seventh return distance. Moreover, the sixth length and the seventh length are both greater than the fifth length, and the sixth return distance and the seventh return distance are both greater than the fifth return distance. In another embodiment, the sixth length can be configured to be greater than the seventh length. In another embodiment, when the lower end 12a of the covering material 12 encounters an external object O and the rotating speed of the driving device 16 and/or the rotating member 14 is higher than the predetermined speed threshold, the microcontroller 262 configures the driving device 16 to operate in the first operation mode to move the lower end 12a of the covering material 12 in another direction. Whereas when the lower end 12a of the covering material 12 encounters an external object O and the rotating speeds of the driving device 16 and/or the rotating member 14 is lower than the predetermined speed threshold, the microcontroller 262 configures the driving device 16 to operate in the second operation mode which stops the driving device 16 from rotating, so that the lower end 12a of the covering material 12 stops moving In the above descriptions, the first to the seventh lengths are merely examples of the lengths that the lower end 12a of the covering material 12 is moved backward when encounters the external object O. Similarly, the first to the seventh return distances are merely examples of the return distances DS that the lower end 12a of the covering material 12 is moved in another moving direction when encounters the external object O. The ordinal number of the aforementioned first to seventh lengths/return distances is for illustrative purposes and not referring to their order or value, which should not be deemed as the limitations of the present disclosure.

In the drawings, the motor 20 and the decelerator 22 of the driving device 16 are respectively drawn as separated elements for the purposes of conciseness and clear explanation. In the above embodiments, the driving device 16 may also include more than one motor and/or more than one decelerator. For example, when the microcontroller 262 configures the driving device 16 to drive the rotating member 14 in the first rotating direction D1, the motor 20 and a first decelerator (not shown in the figures) may be used to drive the rotating member 14 in the first rotating direction D1. Whereas, when the microcontroller 262 configures the driving device 16 to drive the rotating member 14 in the second rotating direction D2, the motor 20 and a second decelerator (not shown in the figures) may be used to drive the rotating member 14 in the second rotating direction D2. In another embodiment, when the microcontroller 262 configures the driving device 16 to drive the rotating member 14 in the first rotating direction D1, a first motor (not shown in the figures) and the decelerator 22 may be used to drive the rotating member 14 in the first rotating direction D1. Whereas, when the microcontroller 262 configures the driving device 16 to drive the rotating member 14 in the second rotating direction D2, a second motor (not shown in the figures) and the decelerator 22 may be used to drive the rotating member 14 in the second rotating direction D2. In another embodiment, when the microcontroller 262 configures the driving device 16 to drive the rotating member 14 in the first rotating direction D1, the first motor and the first decelerator may be used to drive the rotating member 14 in the first rotating direction D1. Whereas, when the microcontroller 262 configures the driving device 16 to drive the rotating member 14 in the second rotating direction D2, the second motor and the second decelerator may be used to drive the rotating member 14 in the second rotating direction D2.

In the above embodiments, when referring to a component A is connected to a component B, the two components may be directly or indirectly connected mechanically, structurally, electrically, or in other suitable manners as described in the context.

The above descriptions are only some possible embodiments of the present disclosure. All equivalent structures and methods which employ the concepts disclosed in this specification and the appended claims should fall within the scope of the present disclosure.

What is claimed is:

1. An electric window covering, comprising:
   a covering material;
   a driving device connected to the covering material through at least one cord, wherein the at least one cord is taut without an external force exerted on the covering material; and
   a control device, connected to the driving device, comprising a microcontroller, a position detecting module, and a trigger detecting module;
   wherein when the microcontroller configures the driving device to activate, the driving device drives the covering material to move a lower end of the covering material upward in a first moving direction to raise the covering material by reeling in the at least one cord or to move the lower end of the covering material downward in a second moving direction to lower the covering material by releasing the at least one cord;
   wherein when the microcontroller configures the driving device to stop, the driving device stops the covering material from moving;
   wherein the position detecting module is configured to detect a position of the lower end of the covering material to generate a position information;
   wherein when the lower end of the covering material is stopped, the microcontroller is configured to compare the position information with a reference position to generate a position relationship with respect to the reference position;
   wherein the trigger detecting module is configured to detect the at least one cord changing from taut to loose in response to the covering material being moved by the external force for generating a detecting result;
   wherein when the lower end of the covering material is stopped and the microcontroller determines that a trigger event is received according to the detecting result, the microcontroller configures the driving device to move the lower end of the covering material in one of the first moving direction and the second moving direction according to the position relationship and the trigger event.

2. The electric window covering of claim 1, wherein the trigger detecting module generates a high-position-lifting detecting result when detecting the covering material is moved by a high-position-lifting external force;
   the microcontroller determines that a high-position-lifting trigger event is received according to the high-position-lifting detecting result and according to the position relationship which indicates the position of the lower end of the covering material is higher than the reference position; the microcontroller configures the driving device to move the lower end of the covering material downward according to the high-position-lifting trigger event.

3. The electric window covering of claim 2, wherein the microcontroller determines that the high-position-lifting trigger event is received when the trigger detecting module detects the lower end of the covering material is lifted by the high-position-lifting external force for longer than a first predetermined time and then lowered within a second predetermined time.

4. The electric window covering of claim 2, wherein when the microcontroller determines that the lower end of the covering material has been moved downward to a first predetermined position according to the position information, the microcontroller configures the driving device to stop the covering material from moving.

5. The electric window covering of claim 4, wherein when the lower end of the covering material stops moving after reaching the first predetermined position, the microcontroller configures the driving device to move the lower end of the covering material upward for a first distance.

6. The electric window covering of claim 1, wherein the trigger detecting module generates a low-position-lifting detecting result when detecting the covering material is moved by a low-position-lifting external force; the microcontroller determines that a low-position-lifting trigger event is received according to the low-position-lifting detecting result and according to the position relationship which indicates the position of the lower end of the covering material is lower than the reference position; the microcontroller configures the driving device to move the lower end of the covering material upward according to the low-position-lifting trigger event.

7. The electric window covering of claim 6, wherein the microcontroller determines that the low-position-lifting trigger event is received when the trigger detecting module detects the lower end of covering material is lifted by the low-position-lifting external force for longer than a first predetermined time and then lowered within a second predetermined time.

8. The electric window covering of claim 6, wherein when the microcontroller determines that the lower end of the covering material has been moved upward to a second predetermined position according to the position information, the microcontroller configures the driving device to stop the covering material from moving.

9. The electric window covering of claim 2, wherein the trigger detecting module generate a lifting-while-expanding detecting result when detecting the covering material is moved by a lifting-while-expanding external force while the lower end of the covering material is moving downward; the microcontroller determines that a lifting-while-expanding trigger event is received according to the lifting-while-expanding detecting result; the microcontroller configures the driving device to stop the covering material from moving according to the lifting-while-expanding trigger event.

10. The electric window covering of claim 9, wherein the microcontroller determines that the lifting-while-expanding trigger event is received when the trigger detecting module detects the lower end of the covering material is lifted by the lifting-while-expanding external force for longer than a first predetermined time and then lowered within a second predetermined time.

11. The electric window covering of claim 9, wherein after the driving device stops the covering material from moving according to the lifting-while-expanding trigger event, the microcontroller configures the driving device to move the lower end of the covering material upward for a first distance.

12. The electric window covering of claim 6, wherein the trigger detecting module generates a pulling-while-retracting detecting result when detecting a downward pulling-while-retracting external force applied on the upward moving covering material; the microcontroller determines that a pulling-while-retracting trigger event is received according to the pulling-while-retracting detecting result; the microcontroller configures the driving device to stop the covering material from moving according to the pulling-while-retracting trigger event.

13. The electric window covering of claim 6, wherein the trigger detecting module generates a lifting-while-retracting detecting result and a lowering-while-still detecting result respectively when detecting the upward moving covering material is lifted by a lifting-while-retracting external force and then lowered; the microcontroller determines that a lifting-while-retracting trigger event and a lowering-while-still trigger event are received according to the lifting-while-retracting detecting result and the lowering-while-still detecting result respectively; the microcontroller configures the driving device to stop the covering material from moving according to the lifting-while-retracting trigger event, and then configures the driving device to move the lower end of the covering material downward according to the lowering-while-still trigger event.

14. The electric window covering of claim 13, wherein the microcontroller configures the driving device to stop the lower end of the covering material from moving upward when the trigger detecting module detects the lower end of the covering material is lifted by the lifting-while-retracting external force; the microcontroller configures the driving device to move the lower end of the covering material downward when the trigger detecting module detects the lower end of the covering material previously lifted by the lifting-while-retracting external force is lowered.

15. The electric window covering of claim 13, wherein when the microcontroller determines that the lower end of the covering material has been moved downward to a first predetermined position according to the position information, the microcontroller configures the driving device to stop the lower end of the covering material from moving.

16. The electric window covering of claim 13, wherein the trigger detecting module generates a lifting-during-expanding detecting result when detecting the covering material is moved by a lifting-during-expanding external force while the lower end of the covering material is moving downward; the microcontroller determines that a lifting-during-expanding trigger event is received according to the lifting-during-expanding detecting result; the microcontroller configures the driving device to stop the covering material from moving according to the lifting-during-expanding trigger event.

17. The electric window covering of claim 16, wherein the microcontroller determines that the lifting-during-expanding trigger event is received when the lower end of the covering material is lifted by the lifting-during-expanding external force for longer than a first predetermined time and then lowered within a second predetermined time.

18. The electric window covering of claim 16, wherein after the driving device stops the covering material from moving according to the lifting-during-expanding trigger event, the microcontroller configures the driving device to move the lower end of the covering material upward for a first distance.

19. A control device for controlling an electric window covering, comprising:
a microcontroller for configuring a driving device of the electric window covering to activate for driving a covering material connected to the driving device through at least one cord to move a lower end of the covering material of the electric window covering upward in a first moving direction to raise the covering material by reeling in the at least one cord or to move the lower end of the covering material downward in a second moving direction to lower the covering material by releasing the at least one cord;
a position detecting module configured to detect a position of the lower end of the covering material to generate a position information; and
a trigger detecting module configured to detect the at least one cord changing from taut to loose in response to the covering material being moved by an external force for generating a detecting result;
wherein when the lower end of the covering material is stopped, the microcontroller is configured to compare the position information with a reference position to generate a position relationship with respect to the reference position;
wherein when the lower end of the covering material is stopped and the microcontroller determines that a trigger event is received according to the detecting result, the microcontroller configures the driving device to move the lower end of the covering material in one of the first moving direction and the second moving direction according to the position relationship and the trigger event;
wherein when the microcontroller configures the driving device to stop, the driving device stops the covering material from moving.

20. A method for controlling an electric window covering, comprising:
detecting a position of a lower end of a covering material of the electric window covering to generate a position information by using a position detecting module of the electric window covering;
comparing the position information with a reference position when the lower end of the covering material is stopped to generate a position relationship with respect to the reference position by using a microcontroller of the electric window covering;
detecting at least one cord through which the driving device is connected to the covering material changing from taut to loose in response to the covering material being moved by an external force for generating a detecting result by using a trigger detecting module of the electric window covering;
moving the covering material by using a driving device of the electric window covering according to the position relationship and the trigger event when the lower end of the covering material is stopped and the microcontroller determines that a trigger event is received according to the detecting result; and
configuring the driving device to stop moving the covering material.

* * * * *